(12) United States Patent (10) Patent No.: US 8,457,349 B2
Roberts et al. (45) Date of Patent: *Jun. 4, 2013

(54) SELECTION OF I-FRAMES FOR CLIENT-SIDE WATERMARKING

(75) Inventors: Thomas A. Roberts, Fuquay-Varina, NC (US); Gregory Morgan Evans, Raleigh, NC (US); Cheryl Adams, Cary, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/174,810

(22) Filed: Jul. 1, 2011

(65) Prior Publication Data
US 2011/0261998 A1 Oct. 27, 2011

Related U.S. Application Data

(63) Continuation of application No. 11/555,709, filed on Nov. 2, 2006, now Pat. No. 7,983,440.

(51) Int. Cl.
*G06K 9/00* (2006.01)
(52) U.S. Cl.
USPC .......................................................... 382/100
(58) Field of Classification Search
USPC .... 382/100, 232; 713/176; 358/3.28; 380/51, 380/45, 210, 287
See application file for complete search history.

(56) References Cited

U.S. PATENT DOCUMENTS

| | | | |
|---|---|---|---|
| 5,613,004 A | 3/1997 | Cooperman et al. | |
| 5,687,236 A | 11/1997 | Moskowitz et al. | |
| 5,809,139 A | 9/1998 | Girod et al. | |
| 5,905,800 A | 5/1999 | Moskowitz et al. | |
| 6,141,753 A | 10/2000 | Zhao et al. | |
| 6,282,299 B1 | 8/2001 | Tewfik et al. | |
| 6,389,541 B1 | 5/2002 | Patterson | |

(Continued)

FOREIGN PATENT DOCUMENTS

| | | |
|---|---|---|
| GB | 2306869 A | 5/1997 |
| WO | 2006046099 A2 | 5/2006 |

OTHER PUBLICATIONS

Dittman, J., et al., "Robust MPEG Video Watermarking Technologies," Proceedings of the Sixth ACM international Conference on Multimedia, 1998, http://www.ipsi.fraunhofer.de/mobile/publications/fullpapers/ACM/acm_ab.doc, 10 pages.

(Continued)

*Primary Examiner* — Le Vu
*Assistant Examiner* — Amara Abdi
(74) *Attorney, Agent, or Firm* — Withrow & Terranova, PLLC

(57) ABSTRACT

A system and method are provided for selecting frames of a compressed video stream that may be used for client-side watermarking. In general, a content source evaluates a number of Intra-Frames (I-Frames) in the compressed video stream using a sample watermark that is similar to actual watermarks that may be used for client-side watermarking. More specifically, each of a number of I-Frames in the compressed video stream is evaluated by first watermarking the I-Frame with the sample watermark. Associated frames in the compressed video stream are then decoded using the watermarked I-Frame. An error value for the decoded video frames is then computed. If the error value is outside of a predetermined error threshold range, the I-Frame is selected as an I-Frame that may be used for client-side watermarking.

11 Claims, 16 Drawing Sheets

U.S. PATENT DOCUMENTS

| | | |
|---|---|---|
| 6,510,234 B1 | 1/2003 | Cox et al. |
| 6,567,107 B1 | 5/2003 | Stannard |
| 6,735,699 B1 | 5/2004 | Sasaki et al. |
| 6,738,493 B1 * | 5/2004 | Cox et al. ............ 382/100 |
| 6,751,670 B1 | 6/2004 | Patterson |
| 6,804,779 B1 | 10/2004 | Carroni et al. |
| 6,975,743 B2 | 12/2005 | Venkatesan et al. |
| 6,987,985 B2 | 1/2006 | Purkayastha et al. |
| 7,003,131 B2 | 2/2006 | Watson et al. |
| 7,016,668 B2 | 3/2006 | Vaidyanathan et al. |
| 7,020,304 B2 | 3/2006 | Alattar et al. |
| 7,036,024 B2 | 4/2006 | Watson |
| 7,065,607 B2 | 6/2006 | England et al. |
| 7,167,599 B1 | 1/2007 | Diehl |
| 7,409,556 B2 | 8/2008 | Wu et al. |
| 7,430,302 B2 | 9/2008 | Thorwirth |
| 7,983,440 B1 * | 7/2011 | Roberts et al. ............ 382/100 |
| 2001/0051996 A1 | 12/2001 | Cooper et al. |
| 2002/0010759 A1 | 1/2002 | Hitson et al. |
| 2002/0049580 A1 | 4/2002 | Kutaragi et al. |
| 2002/0054578 A1 | 5/2002 | Zhang et al. |
| 2002/0057799 A1 | 5/2002 | Kohno |
| 2002/0061029 A1 | 5/2002 | Dillon |
| 2002/0104003 A1 | 8/2002 | Iwamura |
| 2002/0104015 A1 | 8/2002 | Barzilai et al. |
| 2002/0104099 A1 | 8/2002 | Novak |
| 2002/0129367 A1 | 9/2002 | Devara |
| 2002/0144267 A1 | 10/2002 | Gutta et al. |
| 2002/0156842 A1 | 10/2002 | Signes et al. |
| 2002/0168082 A1 | 11/2002 | Razdan |
| 2002/0172395 A1 | 11/2002 | Foote et al. |
| 2003/0009769 A1 | 1/2003 | Hensgen et al. |
| 2003/0012403 A1 | 1/2003 | Rhoads et al. |
| 2003/0050055 A1 | 3/2003 | Ting et al. |
| 2003/0081580 A1 | 5/2003 | Vaidyanathan et al. |
| 2003/0093665 A1 | 5/2003 | Cooper et al. |
| 2003/0138127 A1 | 7/2003 | Miller et al. |
| 2003/0161268 A1 | 8/2003 | Larsson et al. |
| 2004/0008864 A1 | 1/2004 | Watson et al. |
| 2004/0010692 A1 | 1/2004 | Watson |
| 2004/0010694 A1 | 1/2004 | Collens et al. |
| 2004/0030798 A1 | 2/2004 | Andersson et al. |
| 2004/0042421 A1 | 3/2004 | Mahany |
| 2004/0070593 A1 | 4/2004 | Neely et al. |
| 2004/0083487 A1 | 4/2004 | Collens et al. |
| 2004/0086122 A1 | 5/2004 | Watson |
| 2004/0088549 A1 | 5/2004 | Ukai et al. |
| 2004/0088557 A1 | 5/2004 | Malcolm et al. |
| 2004/0117824 A1 | 6/2004 | Karaoguz et al. |
| 2004/0131184 A1 | 7/2004 | Wu et al. |
| 2004/0139047 A1 | 7/2004 | Rechsteiner et al. |
| 2004/0156528 A1 | 8/2004 | Joo et al. |
| 2004/0187005 A1 * | 9/2004 | Molaro ............ 713/176 |
| 2004/0234099 A1 | 11/2004 | Venkatesan et al. |
| 2004/0248615 A1 | 12/2004 | Purkayastha et al. |
| 2004/0263941 A1 | 12/2004 | Chen et al. |
| 2004/0264372 A1 | 12/2004 | Huang |
| 2005/0008017 A1 | 1/2005 | Datta et al. |
| 2005/0034001 A1 | 2/2005 | Pontarelli |
| 2005/0050103 A1 | 3/2005 | Kesteloot et al. |
| 2005/0065891 A1 | 3/2005 | Lee et al. |
| 2005/0081042 A1 | 4/2005 | Venkatesan et al. |
| 2005/0086069 A1 | 4/2005 | Watson et al. |
| 2005/0097331 A1 | 5/2005 | Majidimehr et al. |
| 2005/0108769 A1 | 5/2005 | Arnold et al. |
| 2005/0120127 A1 | 6/2005 | Bradley et al. |
| 2005/0125405 A1 | 6/2005 | Watson et al. |
| 2005/0182989 A1 | 8/2005 | Zarnke et al. |
| 2005/0183120 A1 | 8/2005 | Jain et al. |
| 2005/0192987 A1 | 9/2005 | Marsh |
| 2005/0201726 A1 | 9/2005 | Malcolm et al. |
| 2005/0216942 A1 | 9/2005 | Barton |
| 2005/0220321 A1 | 10/2005 | Langelaar |
| 2005/0239497 A1 | 10/2005 | Bahl et al. |
| 2005/0251491 A1 | 11/2005 | Medina et al. |
| 2005/0286438 A1 | 12/2005 | Rajkotia |
| 2006/0010274 A1 | 1/2006 | Olson |
| 2006/0015735 A1 | 1/2006 | Kudo et al. |
| 2006/0047967 A1 | 3/2006 | Akhan et al. |
| 2006/0048185 A1 | 3/2006 | Alterman |
| 2006/0048186 A1 | 3/2006 | Alterman |
| 2006/0050880 A1 | 3/2006 | Taylor et al. |
| 2006/0053452 A1 | 3/2006 | Lee et al. |
| 2006/0056349 A1 | 3/2006 | Nakatugawa et al. |
| 2006/0059560 A1 | 3/2006 | Montulli |
| 2006/0072786 A1 | 4/2006 | Watson et al. |
| 2006/0075243 A1 | 4/2006 | Lakamp et al. |
| 2006/0085830 A1 | 4/2006 | Bruck et al. |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095792 A1 | 5/2006 | Hurtado et al. |
| 2006/0123235 A1 | 6/2006 | Vanstone |
| 2006/0127037 A1 | 6/2006 | Van Hoff et al. |
| 2006/0133644 A1 | 6/2006 | Wells et al. |
| 2006/0156003 A1 | 7/2006 | Zhang et al. |
| 2006/0161776 A1 | 7/2006 | Van Der Veen et al. |
| 2006/0165169 A1 | 7/2006 | Ng et al. |
| 2006/0173794 A1 | 8/2006 | Sellars et al. |
| 2006/0174128 A1 | 8/2006 | Yuval |
| 2006/0200416 A1 | 9/2006 | White et al. |
| 2007/0133673 A1 | 6/2007 | Imaizumi |
| 2008/0044087 A1 | 2/2008 | Levy et al. |
| 2009/0037388 A1 | 2/2009 | Cooper et al. |
| 2009/0287837 A1 | 11/2009 | Felsher |

OTHER PUBLICATIONS

Fridrich, J., "Applications of Data Hiding in Digital Images," Tutorial for the ISPACS '98 Conference in Melbourne, Australia, Nov. 4-6, 1998, 33 pages.

Judge, P., et al., "WHIM: Watermarking Multicast Video with a Hierarchy of Intermediaries," Computer Networks: The International Journal of Computer and Telecommunications Networking Archive, 2002, vol. 39, Issue 6, pp. 699-712.

Koch, E., et al., "Towards Robust and Hidden Image Copyright Labeling," Proceedings of 1995 IEEE Workshop on Nonlinear Signal and Image Processing, Jun. 20-22, 1995, 4 pages.

No Author, "Double 108Mbps Wireless PC Card (WG511U), Netgear, Inc.," PC Connection, 2006, http://http://www.pcconnection.com/ProductDetail?sku=5373172&SourceID=k40132.

No Author, "Gefen HDMI CAT-5 Extreme User Manual", 2006, 16 pages.

No Author, "Global-Link Product Manual," Logical Solutions Inc., Jan. 2005, 68 pages.

No Author, "Global-Link: KVM over IP", http://www.thinklogical.com/products/globalLink.php, accessed Jul. 13, 2007.

No Author, "HDTV Extender", Network Technologies Incorporated, http://www.nti1.com/hdtv-extend.html, 2005.

No Author, "Introducing the World's First 'Legal' HDMI Distribution Amp with HDCP on Every Port!", PureLink Digital Extender, Dtrovision LLC, http://www.dtrovision.com, accessed Jul. 13, 2007.

No Author, "Kaleidescape Home Page", Kaleidescape, Inc., http://www.kaleidescape.com, accessed Jul. 13, 2007.

No Author, "MediaMax Overview", http://www.axonix.com/mediamax/, accessed Jul. 13, 2007.

No Author, "Xtendex Series ST-C5DVI-150 150 Foot DVI Video Extender Installation and Operation Manual," Network Technologies Incorporated, revised Oct. 16, 2006.

Raisinghani, V., "ECLAIR: An Efficient Cross Layer Architecture for Wireless Protocol Stacks," 5th World Wireless Congress, San Francisco, CA, May 25-28, 2004.

Setton, E., et al., "Cross-Layer Design of Ad Hoc Networks for Real-Time Video Streaming," IEEE Wireless Communications, Aug. 2005, vol. 12, Issue 4, pp. 59-65.

Srivastava, V., et al., "Cross-Layer Design: A Survey and the Road Ahead," IEEE Communications Magazine, Dec. 2005, pp. 112-119.

Non-Final Rejection mailed Dec. 16, 2009 issued by the Patent Office during the prosecution of U.S. Appl. No. 11/555,709. 43 pages.

Final Rejection mailed Apr. 28, 2010 issued by the Patent Office during the prosecution of U.S. Appl. No. 11/555,709. 31 pages.

Non-Final Rejection mailed Aug. 10, 2010 issued by the Patent Office during the prosecution of U.S. Appl. No. 11/555,709. 45 pages.

Non-Final Rejection mailed Oct. 28, 2010 issued by the Patent Office during the prosecution of U.S. Appl. No. 11/555,709. 33 pages.

Notice of Allowance mailed Mar. 17, 2011 issued by the Patent Office during the prosecution of U.S. Appl. No. 11/555,709. 9 pages.

Degermark, Mikael, et al., "Low-loss TCP/IP Header Compression for Wireless Networks," MOBICOM '96, Proceedings of the Second Annual International Conference on Mobile Computing and Networking, Rye, New York, USA, Nov. 10-12, 1996, ACM 1996, 14 pages.

* cited by examiner

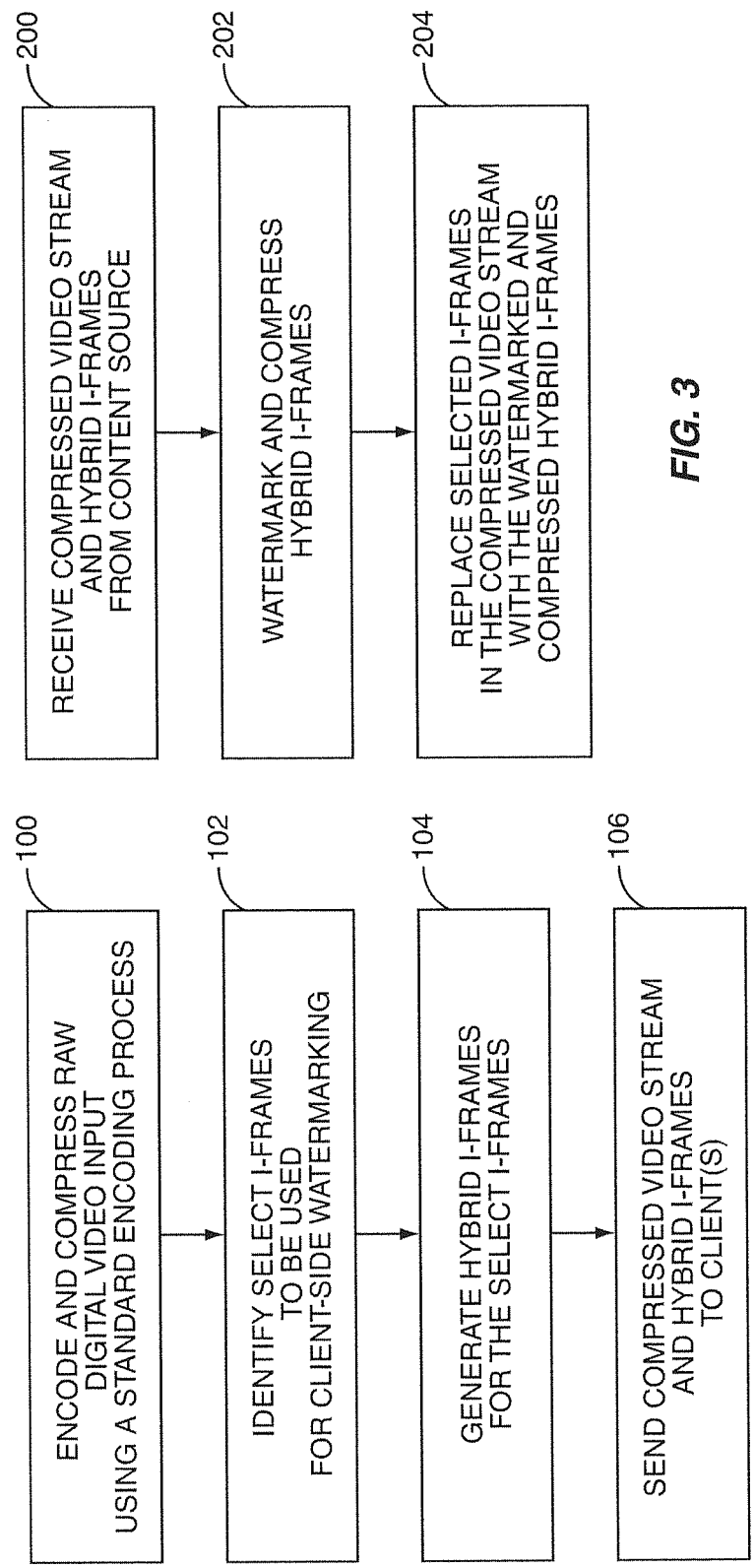

SELECTION OF I-FRAMES FOR CLIENT-SIDE WATERMARKING

CROSS-REFERENCE TO RELATED APPLICATION

The present application is a continuation of U.S. patent application Ser. No. 11/555,709, filed on Nov. 2, 2006, the disclosure of which is hereby incorporated by reference in its entirety.

FIELD OF THE INVENTION

The present invention relates to client-side digital watermarking of a compressed video stream and more particularly relates to selecting frames of the compressed video stream to be used for client-side watermarking.

BACKGROUND OF THE INVENTION

Watermarking of digital content is an effective means for identifying copyright information. A digital watermark is data that is encoded into digital content in a manner that may or may not be humanly perceptible. In general, watermarks may be encoded into the digital content in either the spatial domain or the frequency domain. Watermarks provide a way to add non-removable or editable information to content with no or minimal degradation to the original content. Depending on the specific watermark technology, it may be difficult or even impossible to remove the watermark without severely degrading content quality. Companies such as Digimark and Verimatrix have implemented successful digital watermarking technologies for still photos and video imaging respectively.

In a broadcast or multicast video transport system, digital watermarking can most easily be accomplished at the source of the video broadcast. This approach delivers video content having a common watermark to each termination or client receiving the broadcast and can clearly provide a non-removable label identifying copyright restrictions. However, this common watermark provides no deterrent to the user against anonymous redistribution. Such redistribution can occur through public Peer-to-Peer (P2P) networks, darknets, or postings to video sharing sites. As such, it is desirable to use client-side watermarking at the termination of the multicast to clearly identify the end user. If the user then redistributes the content illegally, the watermark may be used to trace the content to the user.

In order to apply a high fidelity, robust watermark, it is desirable to apply the watermark to non-compressed content or content that has been transmitted in a lossless format. Thus, for client-side watermarking in a video distribution system, an issue arises due to the fact that the distributed video content is highly compressed. Traditionally, the client decompresses the compressed video content, applies the watermark, and then re-compresses the watermarked video content. However, as a result of the decompression, watermarking, and re-compression of the watermarked content, the quality of the video content may be significantly reduced. Recent advances in technology enabling increased compression ratios further compound this issue. For example, the H.264 (or MPEG4 Part 10) standard has a compression ratio of 1:32 which is twice that of an MPEG2. The increased compression ratio of H.264 makes effective client-side watermarking increasingly more difficult due to the lossy nature of the compression.

Thus, there is a need for a system and method for providing client-side watermarking in a manner that does not significantly reduce the quality of the digital content.

SUMMARY OF THE INVENTION

The present invention relates to selecting frames of a compressed video stream that may be used for client-side watermarking. In general, a content source evaluates a number of Intra-Frames (I-Frames) in the compressed video stream using a sample watermark that is similar to actual watermarks that may be used for client-side watermarking. More specifically, for an I-Frame to be evaluated, a watermarked version of the I-Frame, or watermarked I-Frame, is generated. The watermarked I-Frame is watermarked with a sample watermark that is similar to an actual watermark to be used for client-side watermarking. Associated frames in the compressed video stream are then decoded using the watermarked I-Frame, and an error value for the decoded video frames is computed. If the error value is outside of a predetermined error threshold range, the I-Frame is selected as an I-Frame that may be used for client-side watermarking. The predetermined error threshold range may be greater than a predetermined error threshold value. However, depending on how the predetermined error threshold value is calculated, the predetermined error threshold range may alternatively be less than a predetermined error threshold value or some range of error threshold values.

In one embodiment, I-Frames may be evaluated to select I-Frames for a hybrid client-side watermarking scheme. More specifically, a content source encodes a raw digital video input to provide a compressed video stream. A number of the I-Frames of the compressed video stream are evaluated using a sample watermark in order to select I-Frames that may be used for client-side watermarking. Using the raw digital video input, the content source generates a hybrid I-Frame stream including a number of low-loss I-Frames corresponding to one or more of the selected I-Frames. The content source provides the compressed video stream and the hybrid I-Frame stream to a client. The client watermarks the hybrid I-Frames and replaces the corresponding I-Frames in the compressed video stream with the watermarked hybrid I-Frames to provide a watermarked version of the compressed video stream.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 illustrates the operation of the source-side encoder of the content source of FIG. 1 to provide both a compressed video stream and a hybrid I-Frame stream to one or more client devices according to one embodiment of the present invention;

FIG. 3 illustrates the operation of the client-side re-encoder of the client device of FIG. 1 to provide a watermarked copy of the compressed video stream using the hybrid I-Frames according to one embodiment of the present invention;

Figure 1:
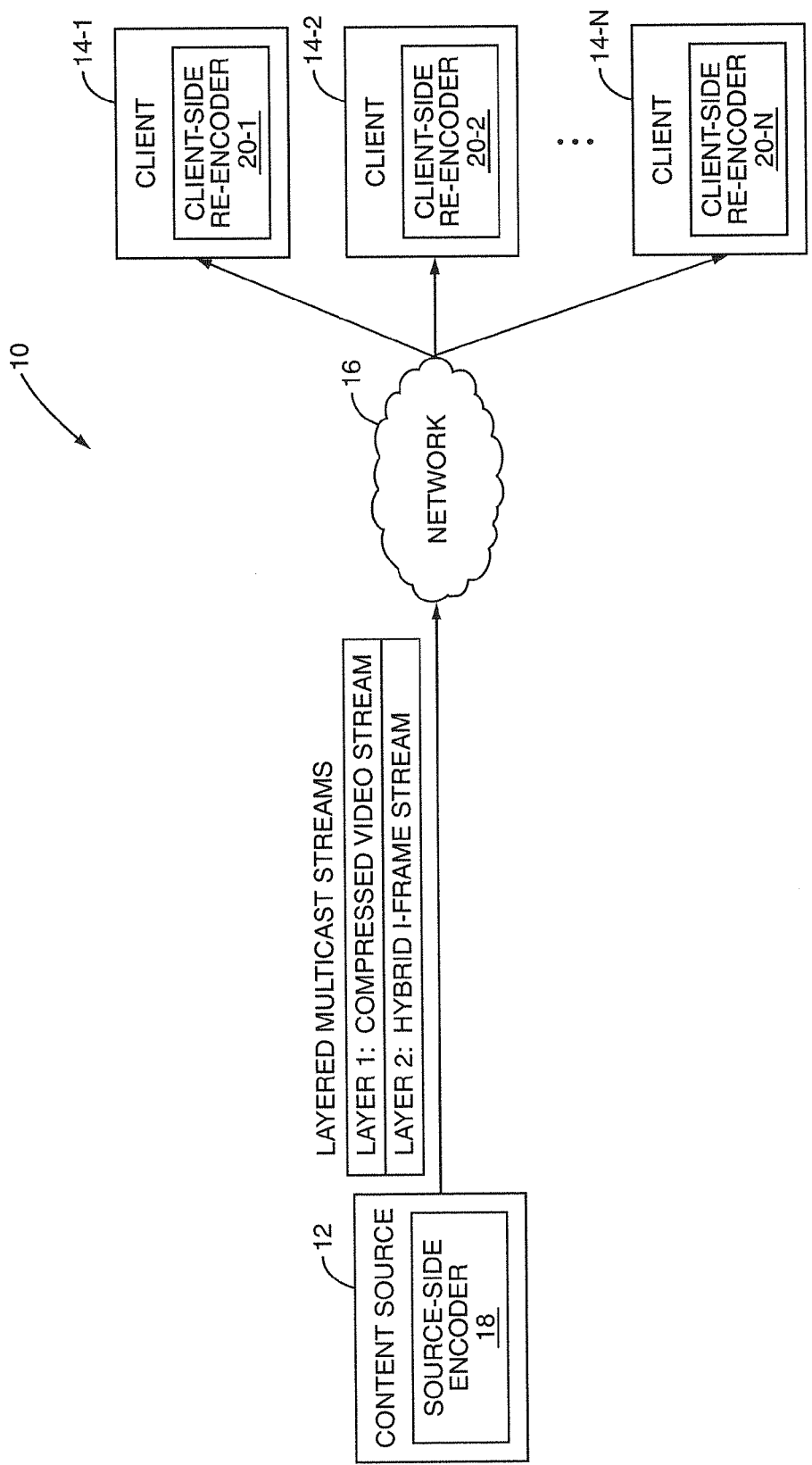
FIG. 1 illustrates a system enabling client-side watermarking of digital video content using hybrid I-Frames according to one embodiment of the present invention.
Figure 6:
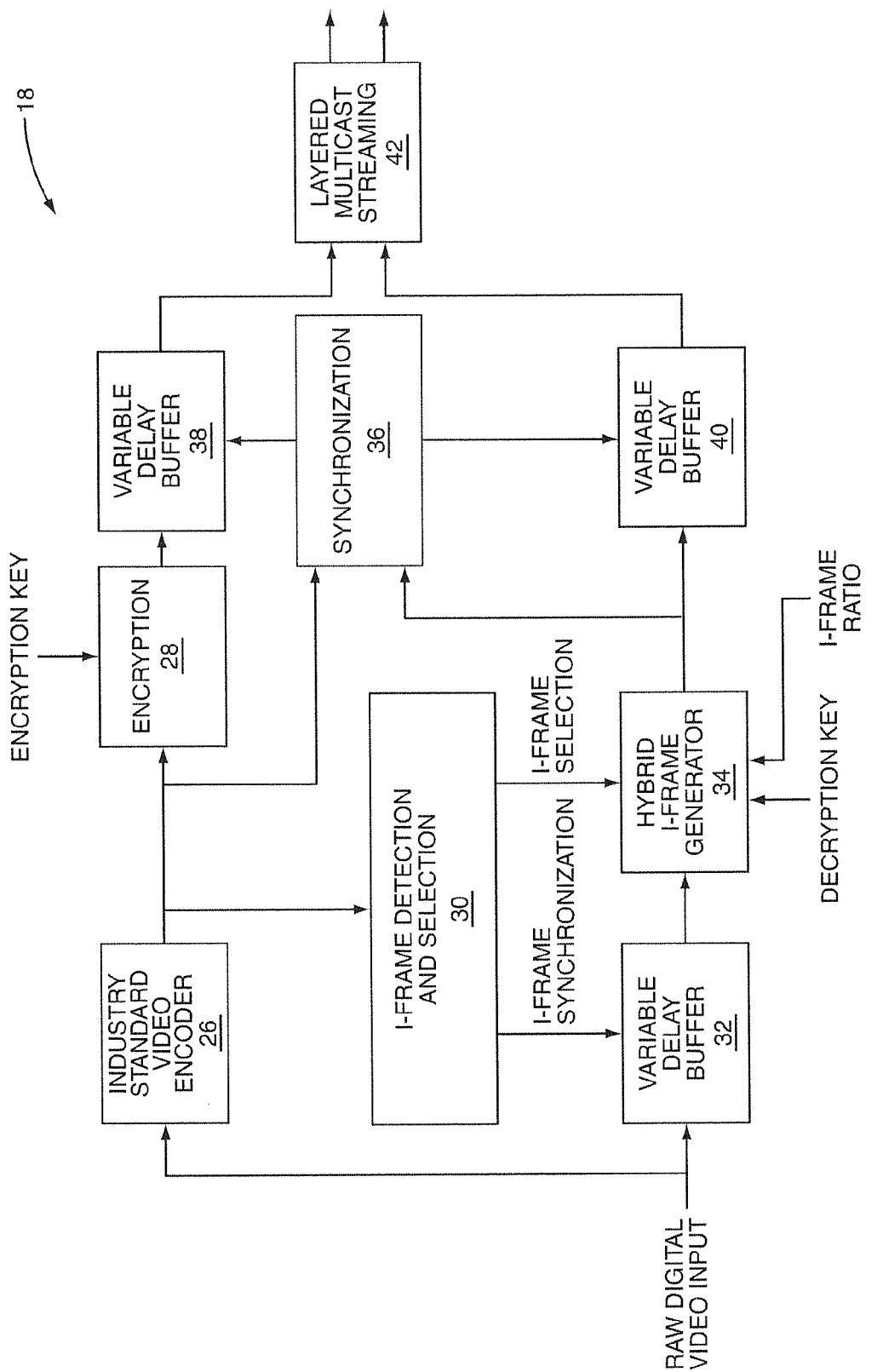
FIG. 6 is a more detailed illustration of the source-side encoder of FIGS. 1 and 5 according to one embodiment of the present invention.
Figure 9:
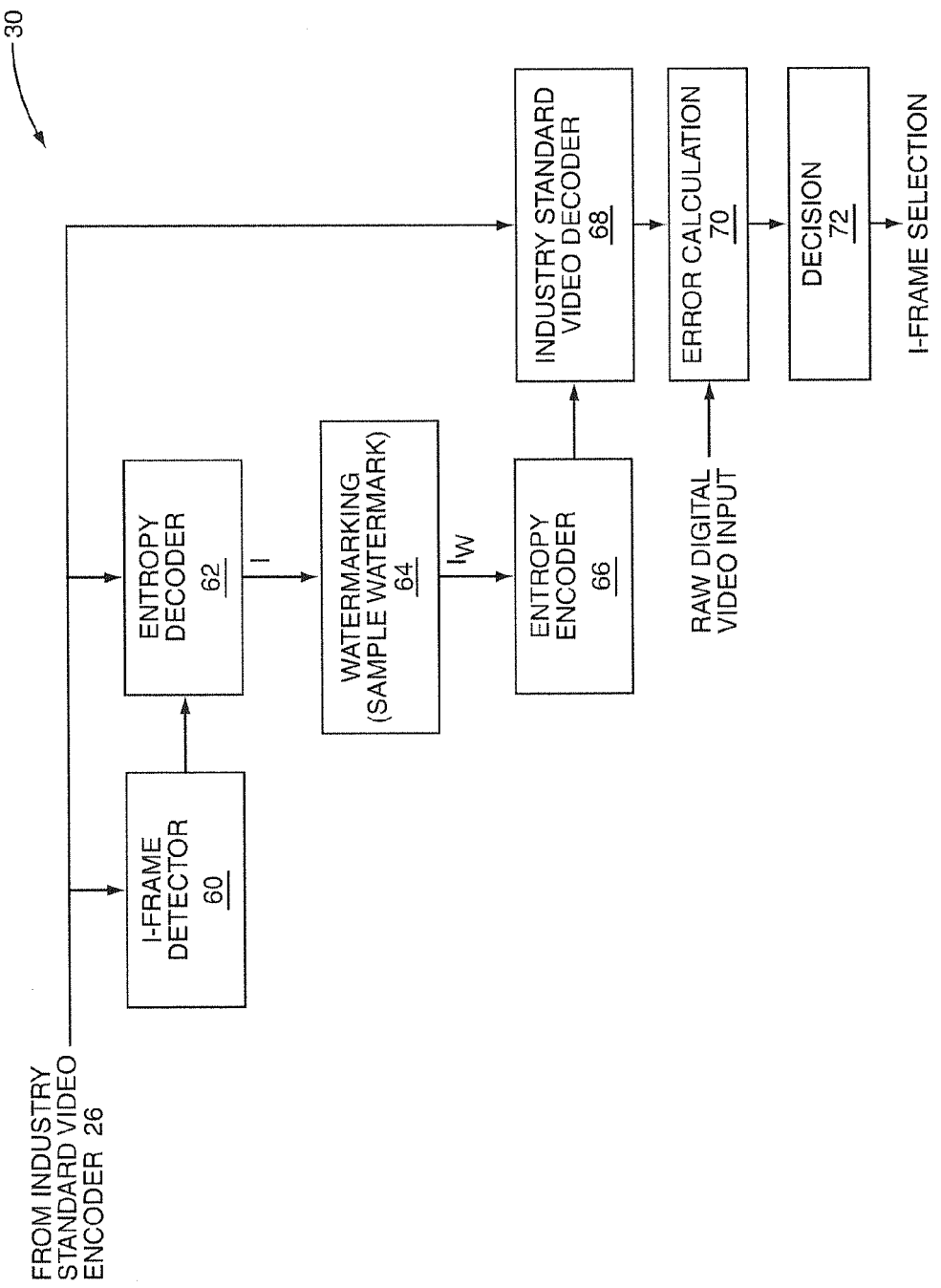
FIG. 9 illustrates the I-Frame detection and selection function of the source-side encoder of FIG. 6 according to one embodiment of the present invention.
Figure 11A:
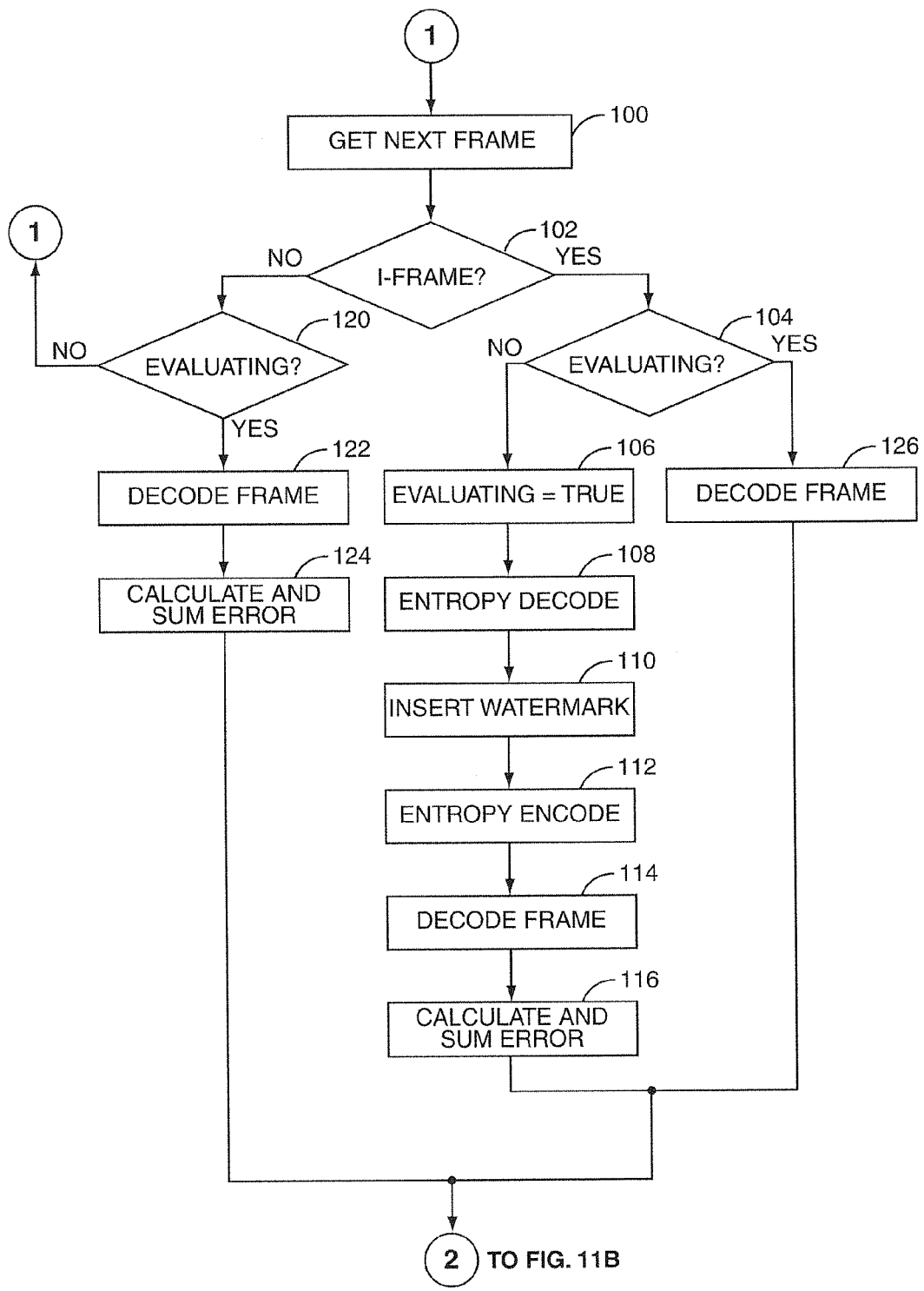
Figure 11B:
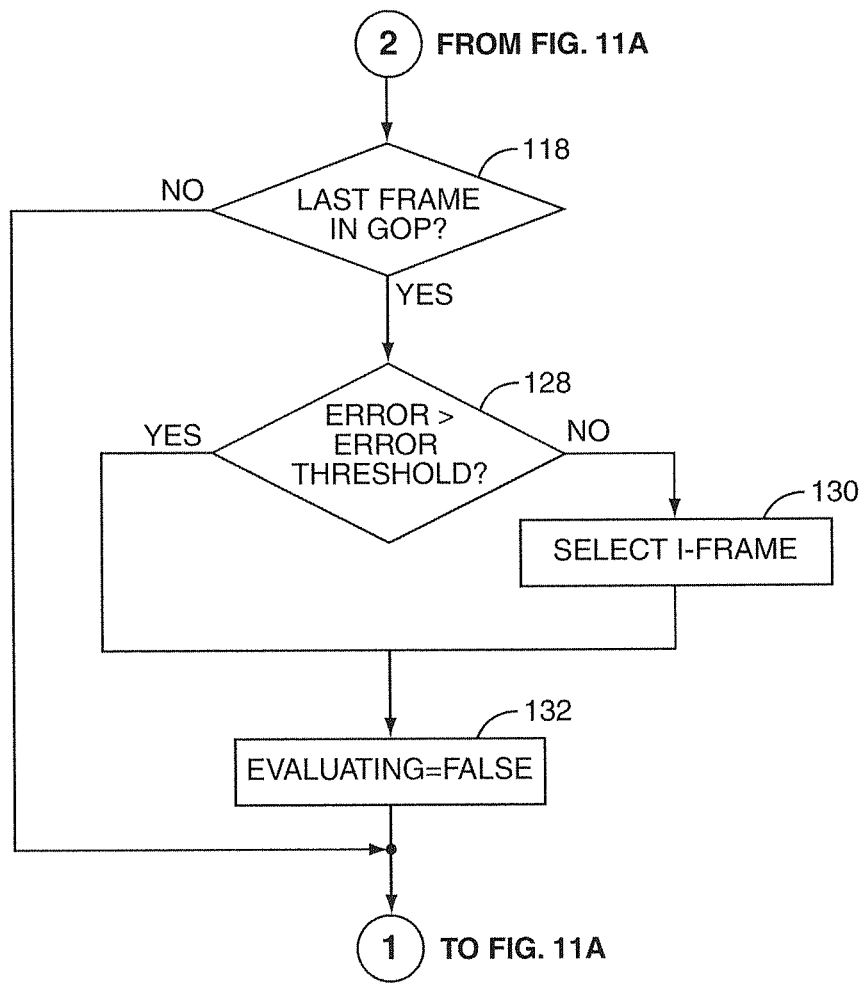
Figure 12:
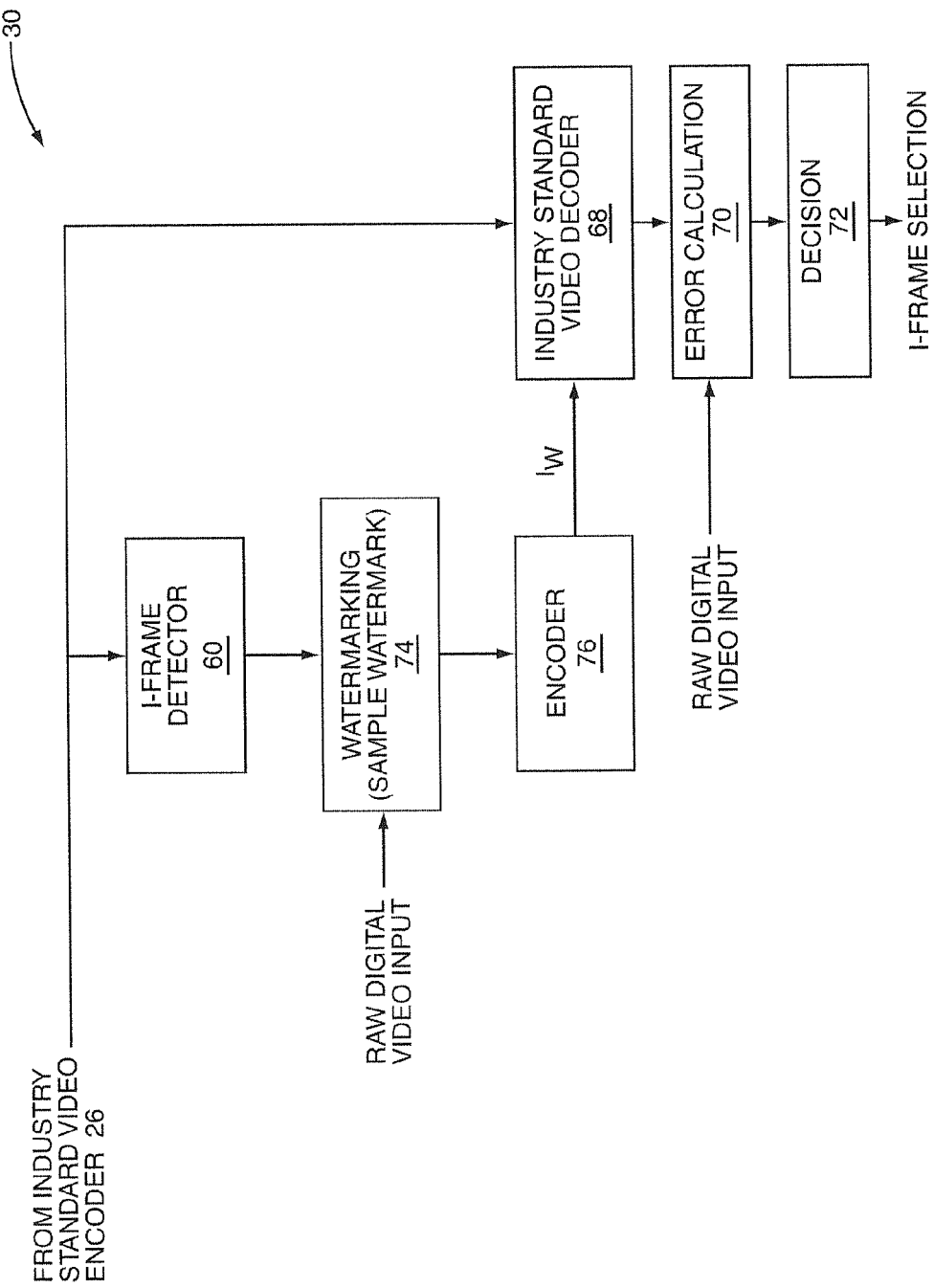
Figure 13:
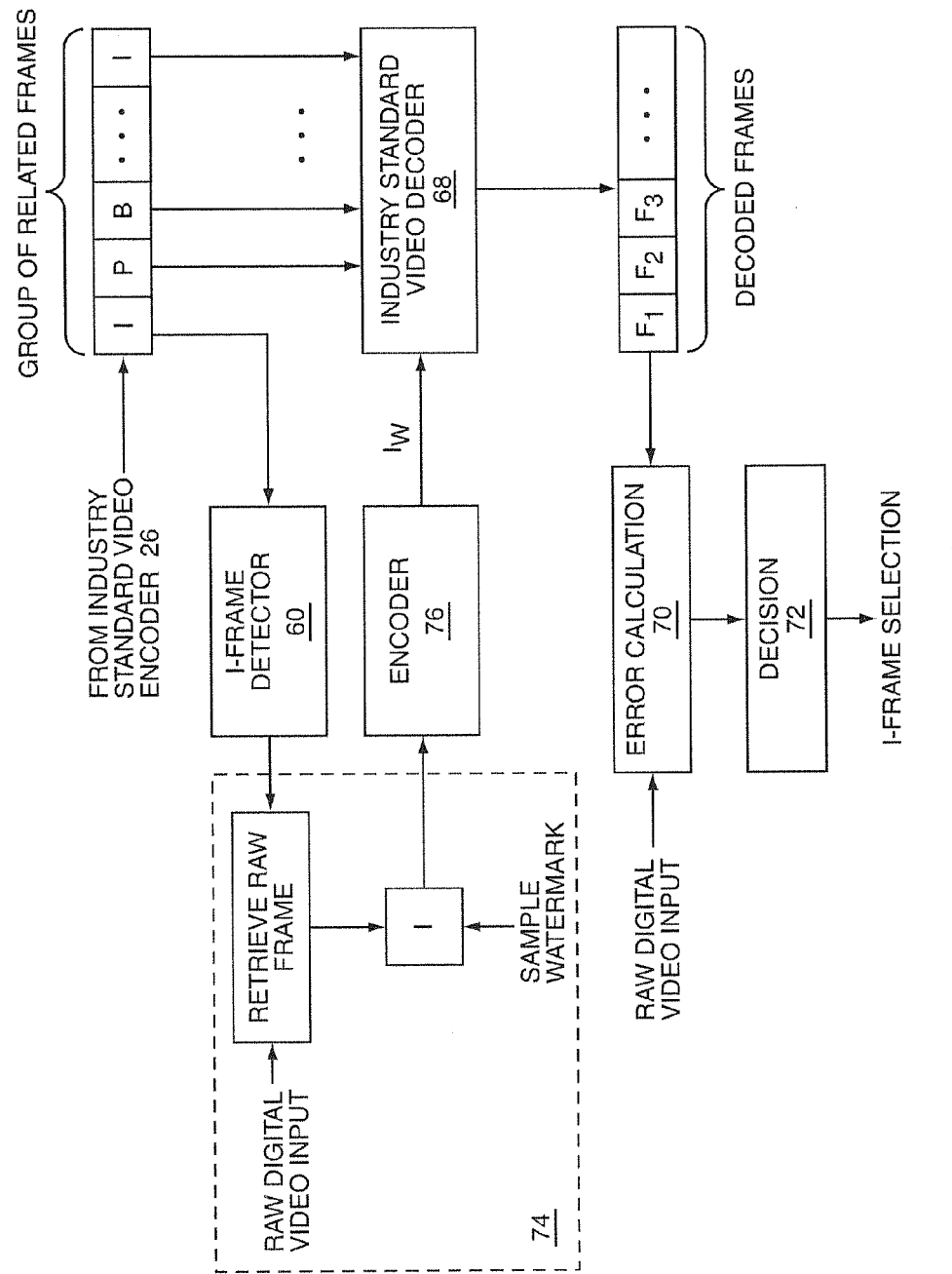
Figure 14A:
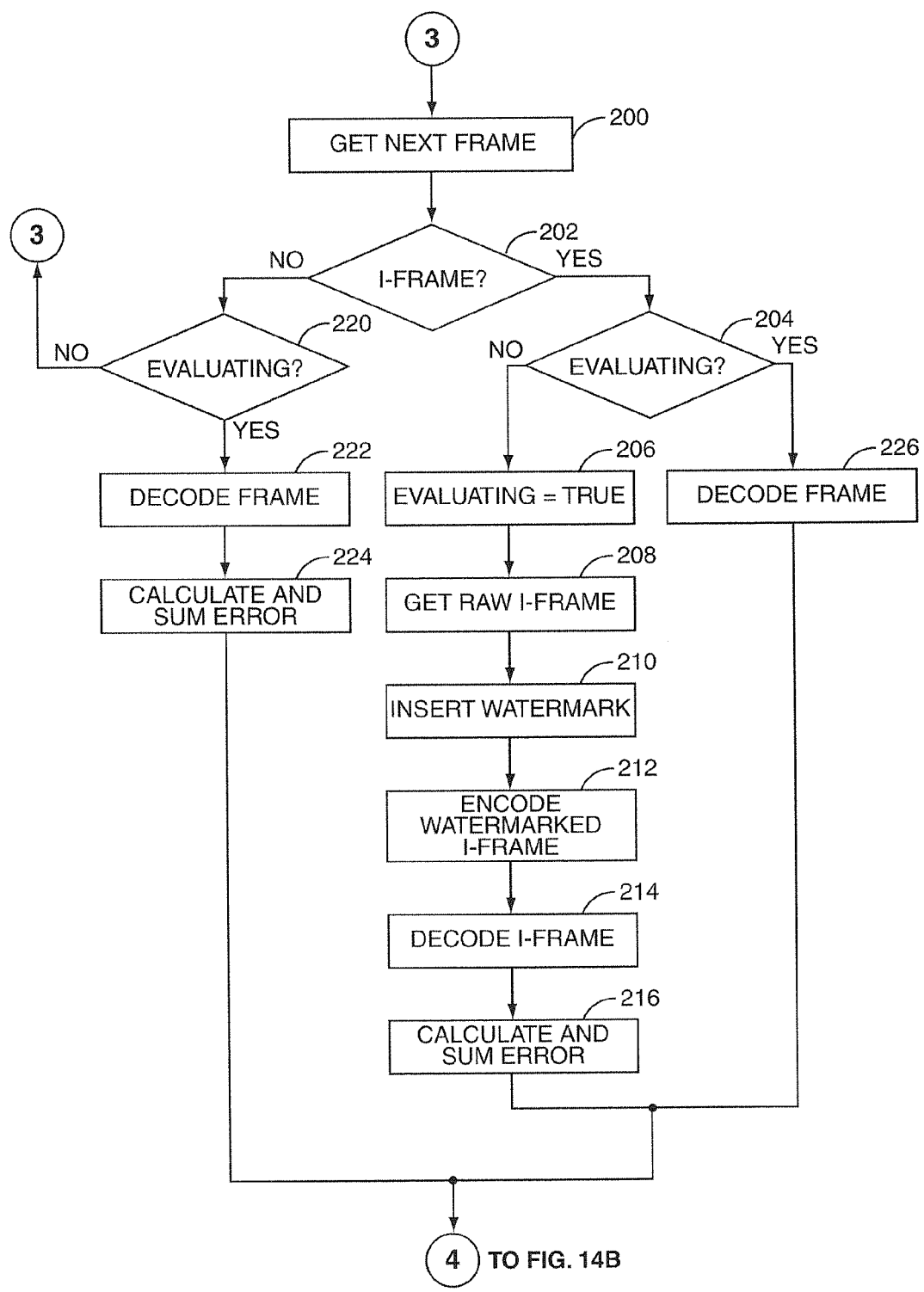
Figure 14B:
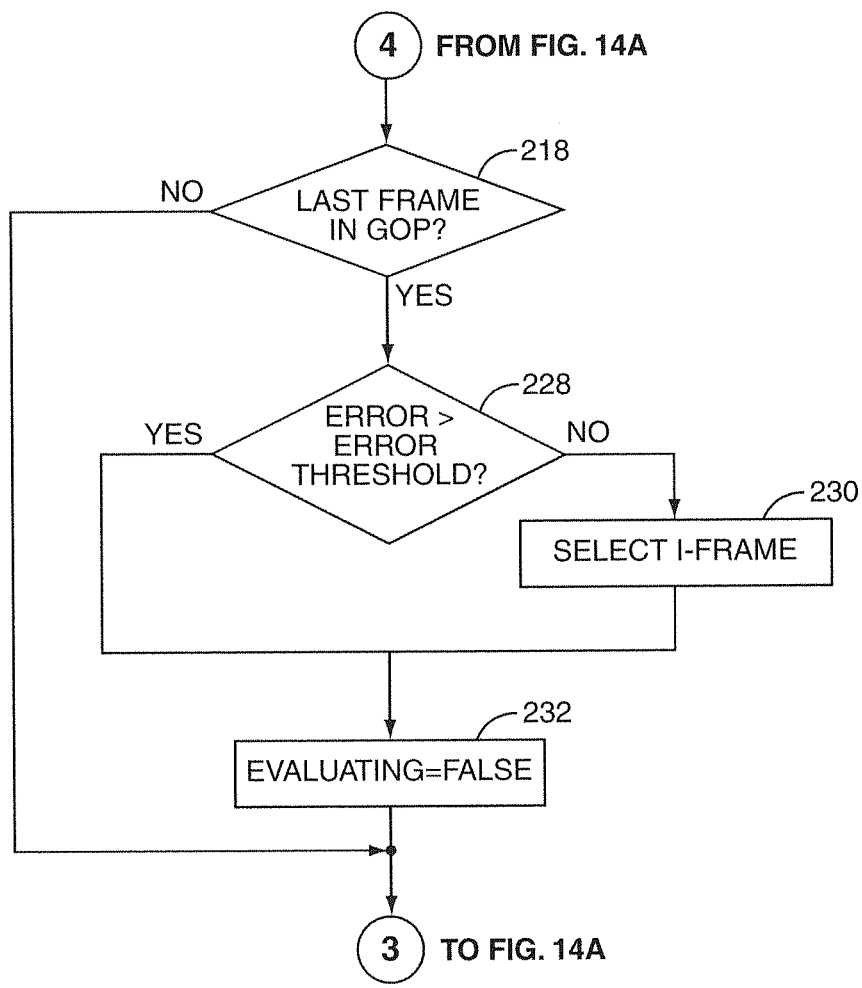
Figures 15, 16:
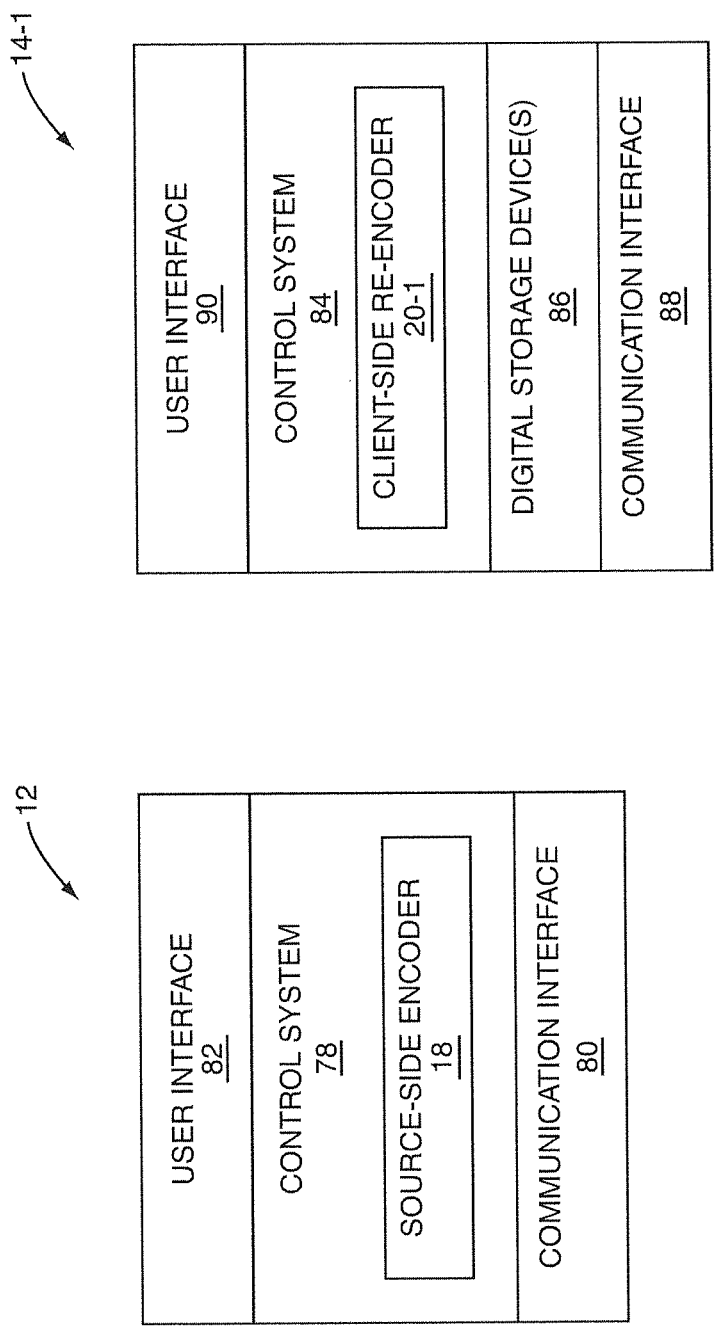

FIGS. 11A and 11B provide a flow chart illustrating the operation of the I-Frame detection and selection function of FIG. 9 according to one embodiment of the present invention;

FIG. 12 illustrates the I-Frame detection and selection function of the source-side encoder of FIG. 6 according to another embodiment of the present invention;

FIG. 13 illustrates the operation of the I-Frame detection and selection function of FIG. 12 while evaluating an I-Frame according to one embodiment of the present invention;

FIGS. 14A and 14B provide a flow chart illustrating the operation of the I-Frame detection and selection function of FIG. 12 according to one embodiment of the present invention;

FIG. 15 is a block diagram of an exemplary embodiment of the content source of FIG. 1; and FIG. 16 is a block diagram of an exemplary embodiment of the client device of FIG. 1.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 providing client-side watermarking using hybrid Intra-Frames (I-Frames) according to one embodiment of the present invention. In general, the system 10 includes a content source 12 and a number of client devices 14-1 through 14-N connected by a network 16. The network 16 may be any type of Wide Area Network (WAN), Local Area Network (LAN), or combination thereof and may include wired and/or wireless components. For example, the network 16 may be the Internet, a land-based cable network, a satellite-based cable network, or the like. The client devices 14-1 through 14-N may be connected to the network via a wired interface; a local wireless interface operating according to, for example, one of the suite of IEEE 802.11 standards; a cellular interface operating according to, for example, a Time Division Multiple Access (TDMA) standard such as the Global System for Mobile Communications (GSM) standard, a Code Division Multiple Access (CDMA) standard such as the CDMA 2000 standard or the 3G Wideband CDMA (W-CDMA) standard; or the like.

The content source 12 may be one or more servers operating to distribute digital video content to the client devices 14-1 through 14-N. For example, the content source 12 may be one or more servers providing an Internet Protocol Television (IPTV) service. In general, the content source 12 includes a source-side encoder 18. The source-side encoder 18 may be implemented in hardware, software, or a combination of hardware and software. In operation, the source-side encoder 18 receives a raw digital video input and processes the raw digital video input to provide a compressed video stream such as, for example, an MPEG2 or MPEG4 (H.264) video stream or any applicable video compression standard. In addition, the source-side encoder 18 provides a hybrid I-Frame stream including a number of low-loss I-Frames corresponding to select ones of the I-Frames in the compressed video stream that are to be used for client-side watermarking. As used herein, "low-loss" means that the hybrid I-Frames in the hybrid I-Frame stream are encoded or compressed with an essentially lossless algorithm or with an algorithm having a compression factor that is relatively low-loss as compared to a compression factor of the algorithm used to generate the compressed video stream.

In this embodiment, the source-side encoder 18 multicasts the compressed video stream and the hybrid I-Frame stream to the client devices 14-1 through 14-N as layered multicast streams. However, while multicasting is used in this embodiment, the present invention is not limited thereto. The content source 12 may alternatively unicast the compressed video content and the hybrid I-Frames to the client devices 14-1 through 14-N using a common transmission channel or separate transmission channels. For example, the content source 12 may provide the compressed video stream to the client device 14-1 via a satellite-based television network and provide the hybrid I-Frame stream to the client device 14-1 via a land-based network such as a cable network or Digital Subscriber Line (DSL) network.

The client devices 14-1 through 14-N may be, for example, set-top boxes, personal computers, mobile devices such as Personal Digital Assistants (PDAs) or mobile phones, or the like. The client devices 14-1 through 14-N generally include client-side re-encoders 20-1 through 20-N. The client-side re-encoders 20-1 through 20-N may be implemented in hardware, software, or a combination of hardware and software.

Using the client-side re-encoder 20-1 as an example, the client-side re-encoder 20-1 operates to receive the compressed video stream and the hybrid I-Frame stream from the content source 12. The client-side re-encoder 20-1 then watermarks the hybrid I-Frames and optionally compresses the watermarked I-Frames to a level appropriate or required for insertion into the compressed video stream. The information included in the watermark may vary depending on the particular implementation. As an example, the watermark may include information such as, but not limited to, the name and address of a user of the client device 14-1, a credit card number of a credit card issued to the owner of the client device 14-1, a device identifier (ID) of the client device 14-1, an Internet Protocol (IP) address of the client device 14-1, or the like or any combination thereof. The client-side re-encoder 20-1 then replaces corresponding I-Frames in the compressed video stream with the watermarked and optionally compressed I-Frames generated from the hybrid I-Frame stream, thereby providing a watermarked version of the compressed video stream. Further, by applying the watermark to the low-loss I-Frames in the hybrid I-Frame stream, a high fidelity, robust watermark is provided.

FIG. 2 illustrates the operation of the content source 12 and more specifically the operation of the source-side encoder 18 according to one embodiment of the present invention. First, the source-side encoder 18 encodes and compresses raw digital video input according to a standard encoding process such as MPEG2, MPEG4, or the like to provide a compressed video stream (step 100). Using MPEG2 as an example, the compressed video stream includes a number of I-Frames, Predicted Frames (P-Frames), and Bidirectional Frames (B-Frames), as will be appreciated by one of ordinary skill in the art. Each I-Frame is associated with number of P-Frames and B-Frames, where the I-Frame and the associated P-Frames and B-Frames form a Group of Pictures (GOP). The I-Frames, P-Frames, and B-Frames may alternatively be referred to as I-Pictures, P-Pictures, and B-Pictures. Further, as used herein, the terms "I-Frames," "B-Frames," and "P-Frames" are intended to include I-Slices, B-Slices, and P-Slices as used in the MPEG4 or H.264 standards. The raw digital video input may be provided to the content source 12 in a non-compressed format. For example, the raw digital video input may be provided according to a standard such as, but not limited to, ITU-R BT.656-4, SMPTE 259M-2006, SMPTE 292M-1998, SMPTE 372M-2002, or SMPTE 424M-2006. However, the present invention is not limited thereto.

The source-side encoder 18 then processes the compressed video stream to identify one or more select I-Frames to be used for client-side watermarking (step 102). The manner in which the select I-Frames are identified may vary depending on the particular implementation. Two exemplary processes for identifying the select I-Frames are discussed below in detail. The source-side encoder 18 then identifies segments of the raw digital video input corresponding to the select I-Frames to be used for client-side watermarking and generates hybrid I-Frames corresponding to the select I-Frames using the identified segments of the raw digital video input (step 104). The source-side encoder 18 then sends the compressed video stream and the hybrid I-Frames to one or more of the client devices 14-1 through 14-N (step 106).

FIG. 3 illustrates the operation of the client-side re-encoder 20-1 according to one embodiment of the present invention. Note that this discussion is equally applicable to the client-side re-encoders 20-2 through 20-N of the other client devices 14-1 through 14-N. First, the client-side re-encoder 20-1 receives the compressed video stream and the hybrid I-Frame stream from the content source 12 (step 200). The client-side re-encoder 20-1 then watermarks the hybrid I-Frames and compresses the watermarked I-Frames to a level appropriate for insertion into the compressed video stream (step 202). The client-side re-encoder 20-1 then replaces the select I-Frames of the compressed video stream with the watermarked and compressed I-Frames to provide a watermarked version of the compressed video stream (step 204).

Again, while the discussion herein focuses on watermarking and compressing the hybrid I-Frames, compression of the watermarked hybrid I-Frames may be optional in some implementations. For example, the watermarked hybrid I-Frames may not be compressed and used to replace the select I-Frames in the compressed video stream at an appropriate point either during or after decompression of the compressed video stream.

Figure 4:
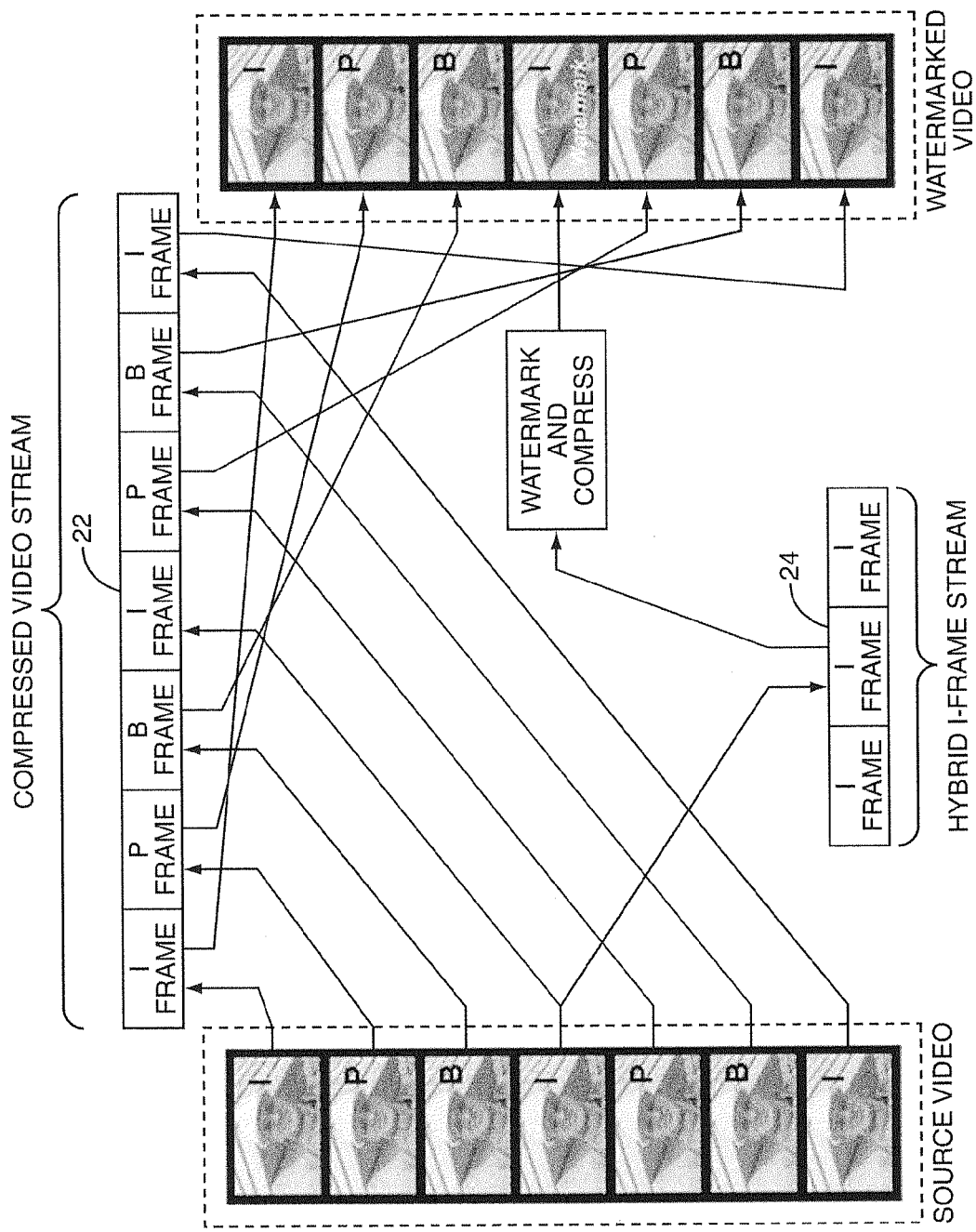
FIG. 4 is a graphical illustration of the operation of the system of FIG. 1 according to one embodiment of the present invention.

FIG. 4 illustrates the replacement of one of the select I-Frames of the compressed video stream with a watermarked and compressed version of a corresponding one of the I-Frames in the hybrid I-Frame stream. More specifically, a select I-Frame 22 in the compressed video stream is replaced by a watermarked and compressed version of a corresponding I-Frame 24 from the hybrid I-Frame stream. In a similar fashion, a number of select I-Frames in the compressed video stream may be replaced with watermarked and compressed versions of the hybrid I-Frames to provide a watermarked version of the compressed video stream.

Figure 5:
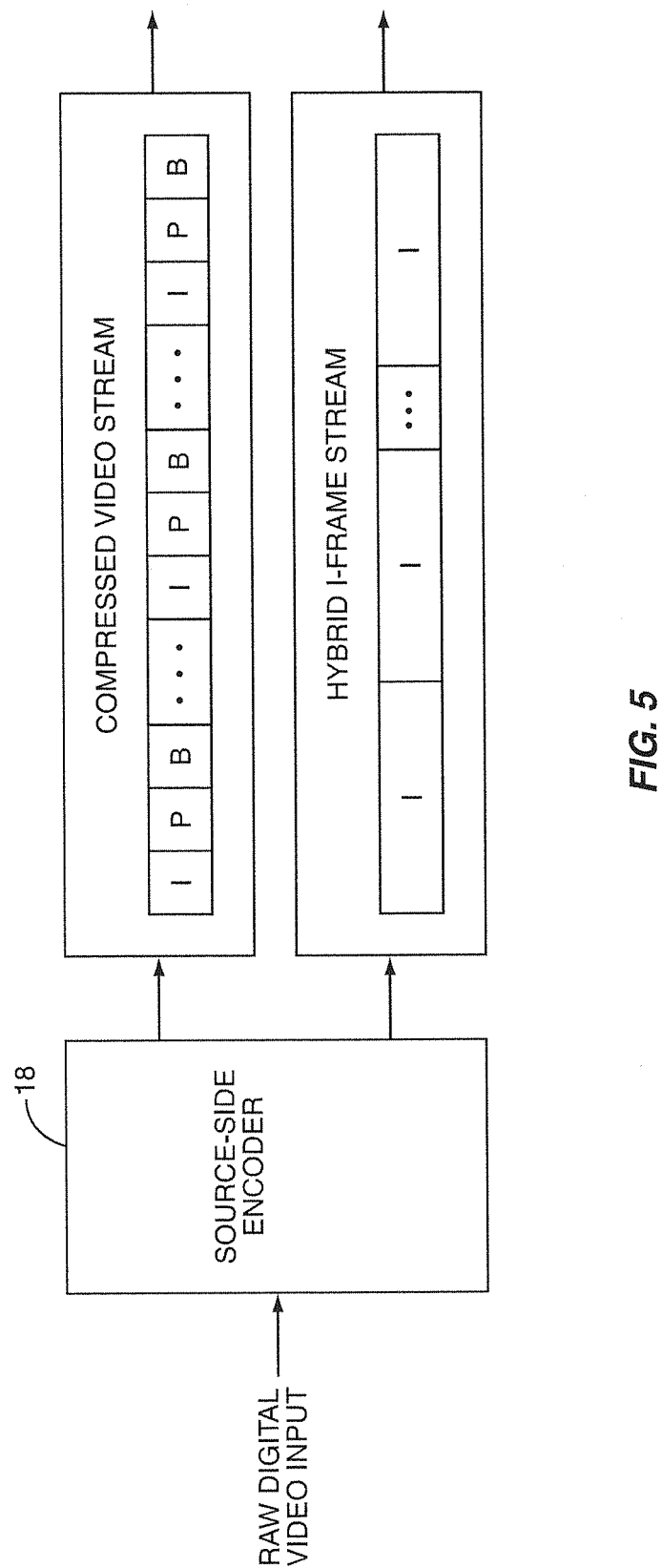
FIG. 5 illustrates the source-side encoder of FIG. 1 according to one embodiment of the present invention.

FIG. 5 is a general illustration of the source-side encoder 18. As shown, the source-side encoder 18 processes raw digital video input to provide the compressed video stream and the hybrid I-Frame stream. FIG. 6 is a more detailed illustration of an exemplary embodiment of the source-side encoder 18. Note that each of the blocks illustrated in FIG. 6 may be implemented in hardware, software, or a combination thereof. In this exemplary embodiment, an industry standard video encoder 26 operates to encode the raw digital video input to provide a compressed video stream. The industry standard video encoder 26 is an encoder operating according to an industry standard video encoding scheme such as MPEG2, MPEG4, H.264, or the like. Optionally, in order to provide additional security, the compressed video stream may be encrypted by an encryption function 28 based on an encryption key to provide an encrypted version of the compressed video stream. Any type of known encryption process that is suitable to the video compression format may be used.

An I-Frame detection and selection function 30 operates to monitor the compressed video stream output by the industry standard video encoder 26 to detect I-Frames. Upon detecting the I-Frames, the I-Frame detection and selection function 30 provides an I-Frame synchronization signal or message to a variable delay buffer 32 such that segments of the raw digital video input corresponding to the I-Frames in the compressed video stream are provided to a hybrid I-Frame generator 34.

The I-Frame detection and selection function 30 also identifies the select I-Frames to be used for client-side watermarking and provides an I-Frame selection signal or message to the hybrid I-Frame generator 34 to identify the select I-Frames. In response, the hybrid I-Frame generator 34 processes segments of the raw digital video input corresponding to the select I-Frames to provide the hybrid I-Frame stream. More specifically, the hybrid I-Frame generator 34 may perform tagging, encapsulation, and compression. Tagging may be used to associate each of the hybrid I-Frames with a corresponding I-Frame in the compressed video stream. The compression for the hybrid I-Frames is preferably lossless or nearly lossless. A lossless compression algorithm is a compression algorithm that allows the exact original data to be reconstructed from the compressed data during decompression. Exemplary lossless compression algorithms include the Huffman coding and arithmetic coding. Alternatively, rather than being lossless, the hybrid I-Frames may be compressed according to a lossy compression scheme that is relatively low-loss as compared to the encoding and compression scheme used by the industry standard video encoder 26. For example, the hybrid I-Frames may have a compression factor of 10 or less. In contrast, in an MPEG4 or H.264 system, the compressed video stream may have a compression factor of 32 for the I-Frame.

In addition, since in this example the compressed video stream is encrypted by the encryption function 28, a decryption key to be used on the client-side to decrypt the compressed video stream may optionally be embedded in one or more of the hybrid I-Frames. As an example, the decryption key may be embedded into one or more of the hybrid I-Frames as a watermark.

The hybrid I-Frame generator 34 may also limit the number of hybrid I-Frames based on a maximum I-Frame ratio. The maximum I-Frame ratio may be input to the hybrid I-Frame generator 34 or be embedded in the hybrid I-Frame generator 34. In general, the maximum I-Frame ratio defines a maximum number of hybrid I-Frames with respect to time. For example, the maximum I-Frame ratio may define the maximum number of hybrid I-Frames per second. Thus, if the I-Frames selected by the I-Frame detection and selection function 30 exceeds the maximum I-Frame ratio, then the hybrid I-Frame generator 34 may limit the number of generated I-Frames such that the maximum I-Frame ratio is not exceeded.

At this point, a synchronization function 36 may optionally control variable delay buffers 38 and 40 to synchronize the encrypted version of the compressed video stream and the hybrid I-Frame stream. In this example, the encrypted version of the compressed video stream and the hybrid I-Frame stream are then multicast to one or more of the client devices 14-1 through 14-N by a layered multicast streaming function 42. For example, the encrypted version of the compressed video stream and the hybrid I-Frame stream may be multicast to the client devices 14-1 through 14-N as provided by Internet Protocol version 4 (IPv4) or Internet Protocol version 6 (IPv6).

Figure 7:
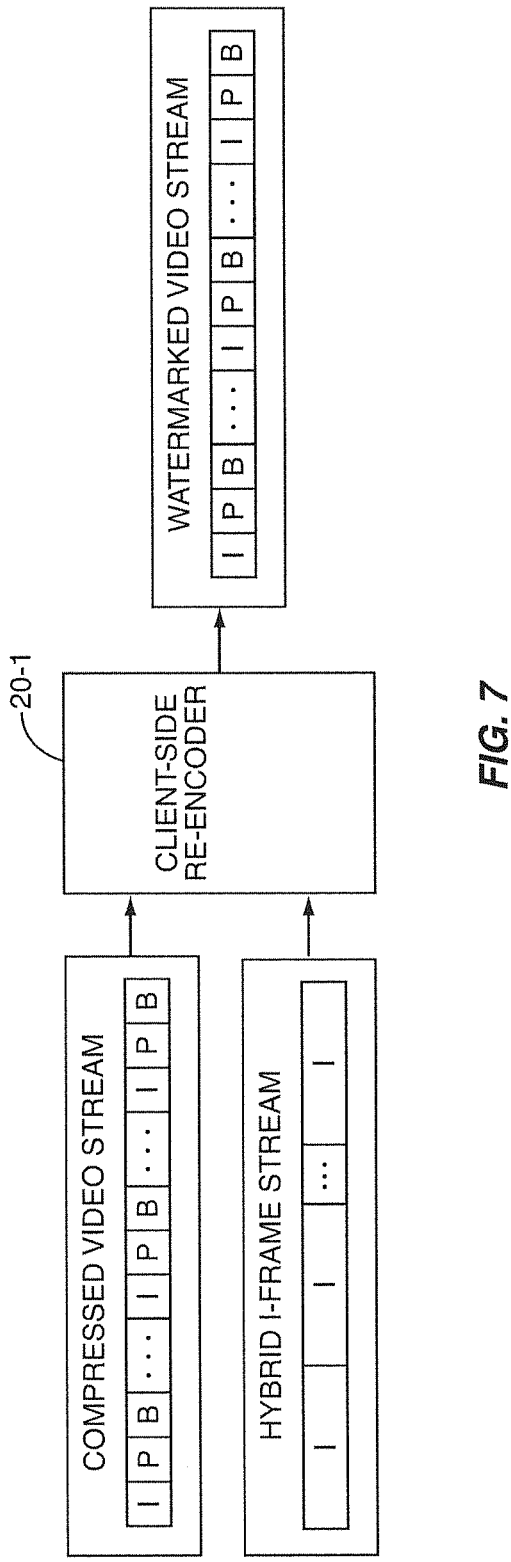
FIG. 7 illustrates the client-side re-encoder of FIG. 1 according to one embodiment of the present invention.

FIG. 7 is a general illustration of the client-side re-encoder 20-1. Note that the following discussion of the client-side re-encoder 20-1 is equally applicable to the client-side re-encoders 20-2 through 20-N. As shown, the client-side re-encoder 20-1 receives the compressed video stream and the hybrid I-Frame stream from the content source 12 and processes the compressed video stream and the hybrid I-Frame stream to provide a watermarked version of the compressed video stream.

Figure 8:
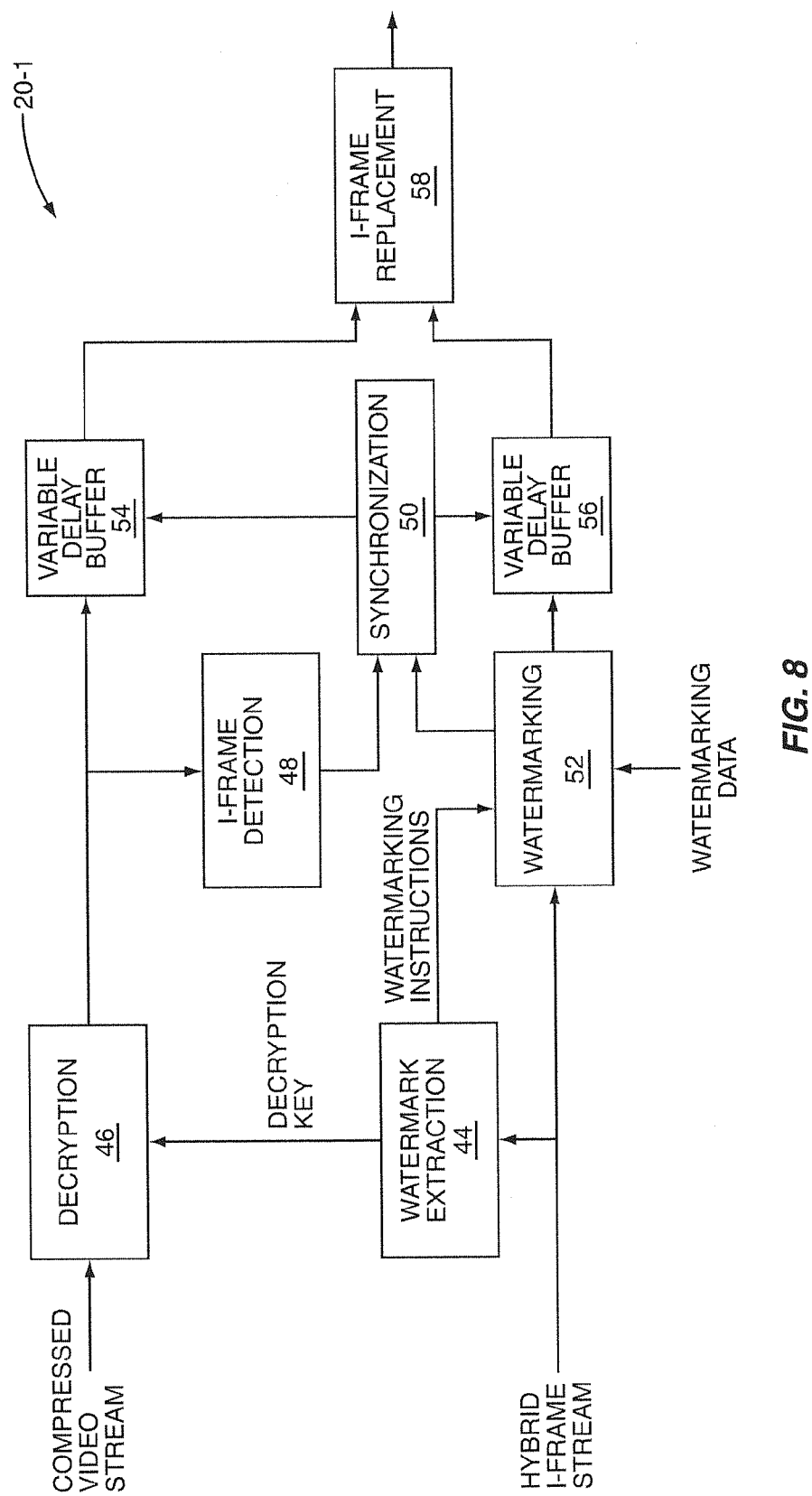
FIG. 8 is a more detailed illustration of the client-side re-encoder of FIGS. 1 and 7 according to one embodiment of the present invention.

FIG. 8 is a more detailed illustration of an exemplary embodiment of the client-side re-encoder 20-1. Note that each of the blocks illustrated in FIG. 8 may be implemented in hardware, software, or a combination thereof. In this exemplary embodiment, a watermark extraction function 44 extracts the decryption key from the hybrid I-Frame stream and provides the decryption key to a decryption function 46. Using the decryption key, the decryption function 46 decrypts the encrypted version of the compressed video stream to provide the compressed video stream. An I-Frame detection function 48 monitors the compressed video stream output by the decryption function 46 to identify the I-Frames in the compressed video stream and sends an I-Frame synchronization signal or message to synchronization function 50. Optionally, the I-Frame detection function 48 may process the I-Frames in a manner similar to that of the I-Frame detection and selection function 30 (FIG. 6) of the source-side encoder 18 to identify the select I-Frames to be replaced by watermarked versions of the hybrid I-Frames. If so, the I-Frame detection function 48 may also provide an I-Frame selection signal or message to the synchronization function 50 identifying the I-Frames that are to be replaced by the watermarked versions of the hybrid I-Frames.

A watermarking function 52 operates to watermark and then compress the hybrid I-Frames. In one embodiment, the hybrid I-Frames may be watermarked with watermarking instructions, which may identify what information, or watermarking data, is to be included in the watermark added to the hybrid I-Frames. For example, the watermarking instructions may provide that the name and address of the user of the client device 14-1, a credit card number of a credit card owned by the user of the client device 14-1, a device ID of the client device 14-1, an IP address of the client device 14-1, or the like is to be included in the watermark. If the hybrid I-Frames are watermarked with watermarking instructions, the watermark extraction function 44 extracts the watermarking instructions and provides the watermarking instructions to the watermarking function 52. Alternatively, the watermarking data may be predetermined and known by the watermarking function 52.

In the illustrated embodiment, the watermarking instructions are provided in the hybrid I-Frames and identify the watermarking data to be included in the watermark. As such, the watermarking data is obtained from, for example, a control system of the client device 14-1 or the user of the client device 14-1. The watermarking function 52 then watermarks the hybrid I-Frames with a watermark including the watermarking data. The particular watermarking technique used by the watermarking function 52 may be any type of watermarking technique such as a spatial domain or frequency domain watermarking technique. An exemplary spatial domain watermarking technique is the Fredrich Algorithm. An exemplary frequency domain watermarking technique is the Khao Kotch Algorithm. However, various other watermarking techniques may be used as will be apparent to one of ordinary skill in the art upon reading this disclosure. Once watermarked, the watermarked hybrid I-Frames are compressed to a level that is appropriate for insertion into the compressed video stream.

The synchronization function 50 controls variable delay buffers 54 and 56 such that the watermarked and compressed hybrid I-Frames are synchronized to the corresponding select I-Frames in the compressed video stream to be replaced at an input of an I-Frame replacement function 58. The I-Frame replacement function 58 then replaces the select I-Frames of the compressed video stream with the watermarked and compressed hybrid I-Frames, thereby providing a watermarked version of the compressed video stream. The watermarked version of the compressed video stream may then be presented to the user via appropriate hardware and/or software. In addition or alternatively, the watermarked version of the compressed video stream may be stored in a digital storage device associated with the client device 14-1.

FIG. 9 is a more detailed block diagram of the I-Frame detection and selection function 30 of the source-side encoder 18 of FIG. 6 according to one embodiment of the present invention. The I-Frame detection and selection function 30 of this embodiment is particularly well suited for frequency domain watermarking techniques. Note that each of the blocks illustrated in FIG. 9 may be implemented in hardware, software, or a combination thereof. In general, the I-Frame detection and selection function 30 of this embodiment operates to select I-Frames that may be used for client-side watermarking using a sample watermark that is similar to an actual watermark to be used for client-side watermarking. For example, if a name, address, and credit card number for the user of the client devices 14-1 through 14-N are to be used for client-side watermarking, then the sample watermark may use a sample name, address, and credit card number as the information for the sample watermark. However, the sample watermark may more generally include data that is in a similar format and size to the watermarking data to be used for client-side watermarking. In order to determine whether a particular I-Frame is a good candidate for watermarking, the I-Frame is watermarked with the sample watermark and the associated P-Frames and B-Frames in the GOP are decoded based on the watermarked I-Frame. An error value is determined for decoded video frames and compared to an error threshold range. The error threshold range may be defined as a range of values greater than a predetermined maximum error threshold value, a range of values less than a predetermined minimum error threshold value, or a range of unacceptable error values depending on how the error value is calculated. If the error is outside of the error threshold range, the I-Frame is selected as an I-Frame that may be used for client-side watermarking. For example, if the error threshold range is defined by a maximum error threshold, the I-Frame is selected as an I-Frame that may be used for client-side watermarking if the error is less than the maximum error threshold.

More specifically, the compressed video stream from the industry standard video encoder 26 (FIG. 6) is monitored by an I-Frame detector 60. When an I-Frame is detected, the I-Frame detector 60 notifies an entropy decoder 62. Using MPEG2 as an example, the I-Frames of the compressed video stream have been transformed into the frequency domain, such as by a Discrete Cosine Transform (DCT), quantized, and entropy encoded. Upon detecting an I-Frame that is to be evaluated, the entropy decoder 62 decodes the I-Frame from the compressed video stream to obtain an entropy decoded I-Frame, which is still in the frequency domain in preparation for watermarking. Note that, as discussed below, not all I-Frames may be evaluated.

A watermarking function 64 then watermarks the entropy decoded I-Frame with the sample watermark using a frequency domain watermarking technique. Preferably, the frequency domain watermarking technique is the same frequency domain watermarking technique to be used by the client devices 14-1 through 14-N for client-side watermarking. Entropy encoder 66, which may be referred to as a re-encoding function, then re-encodes the watermarked I-Frame and provides the watermarked I-Frame to an industry standard video decoder 68. Note that the entropy decoder 62, the watermarking function 64, and the entropy encoder 66 may generally be referred to herein as a watermarking system. Based on the watermarked I-Frame from the entropy encoder 66, the industry standard video decoder 68 decodes the I-Frame and the associated P-Frames and B-Frames for the GOP to provide decoded video frames. The decoded video frames are then provided to an error calculation function 70 and compared to corresponding segments of the raw digital video input in order to calculate an error for the GOP.

More specifically, for each decoded video frame, the decoded video frame is compared to a corresponding segment of the raw digital video input in order to calculate an error for that frame. The comparison may be, for example, pixel by pixel. However, numerous methods for determining an error value between the decoded video frame and the corresponding segment of the raw digital video input will be apparent to one of ordinary skill in the art upon reading this disclosure. The errors for each of the decoded video frames may be combined and optionally averaged to provide the error for the GOP. A decision function 72 then compares the error for the GOP to a predetermined error threshold range. In one embodiment, the error threshold range is defined by a predetermined maximum error threshold value. If the error is greater than the predetermined maximum error threshold value, then the I-Frame is not selected as an I-Frame that may be used for client-side watermarking. If the error is less than the predetermined maximum error threshold value, then the I-Frame is selected as an I-Frame that may be used for client-side watermarking. In addition to the error, the decision function 72 may consider GOP size, or the number of frames in the GOP. Note that it may be desirable to restrict I-Frame selection to those I-Frames associated with GOPs having less than a predetermined maximum number of frames.

While the I-Frame detection and selection function 30 of FIG. 9 uses the industry standard video decoder 68, the present invention is not limited thereto. More specifically, in order to provide the expected input to the industry standard video decoder 68, the watermarked I-Frame provided by the watermarking function 64 is re-encoded by the entropy encoder 66. However, in an alternative embodiment, a custom video decoder, rather than the industry standard video decoder 68, may be used. The custom video decoder may be designed to receive the watermarked I-Frame from the watermarking function 64 without entropy re-encoding.

Figure 10:
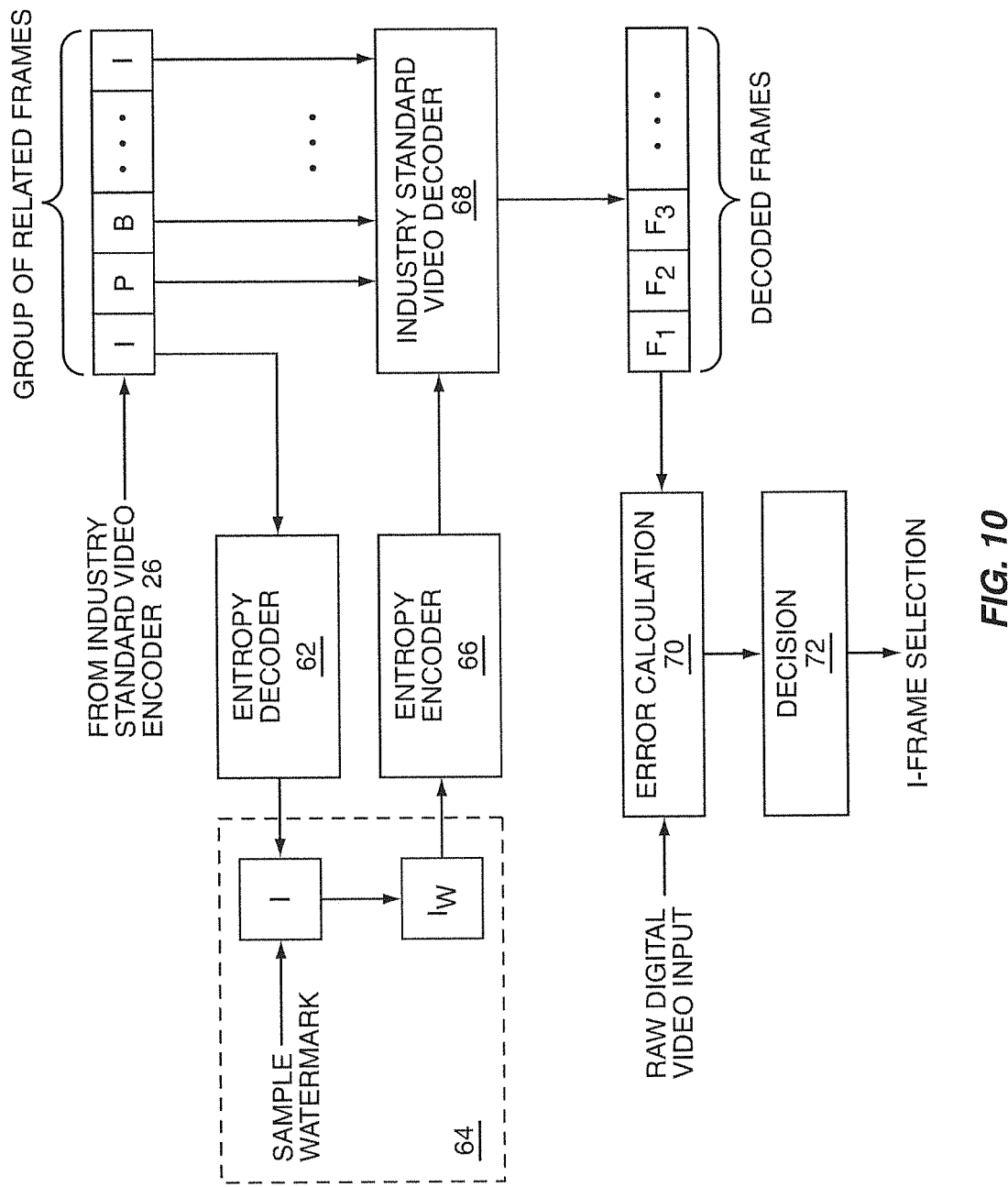
FIG. 10 illustrates the operation of the I-Frame detection and selection function of FIG. 9 while evaluating an I-Frame according to one embodiment of the present invention.

FIG. 10 illustrates the operation of the I-Frame detection and selection function 30 of FIG. 9 during the evaluation of an I-Frame. As illustrated, an I-Frame is entropy decoded, watermarked with the sample watermark, and entropy encoded. The watermarked I-Frame is then provided to the industry standard video decoder 68 and used for decoding the group of related frames to provide decoded video frames ($F_X$). For example, the industry standard video decoder 68 may decode the frames according to the MPEG2 or MPEG4 standard. The group of related frames includes the P-Frames and B-Frames for the GOP as well as the I-Frame for the next GOP. The I-Frame for the next GOP is included if it is referenced by one or more B-Frames in the GOP and therefore needed for decoding. The error calculation function 70 then compares the decoded video frames to the corresponding segments of the raw digital video input to determine an error value for each of the frames and optionally a combined error value for the GOP. The decision function 72 then determines whether to select the I-Frame as an I-Frame that may be used for client-side watermarking based on the error value(s).

The I-Frame detection and selection function 30 preferably does not evaluate two successive I-Frames. More specifically, when decoding the frames in the GOP for the I-Frame being evaluated, the I-Frame in the next GOP may be referenced by one or more B-Frames in the GOP. At the point of decoding the frames in the GOP under evaluation, the I-Frame in the next GOP is not watermarked. As such, the error value for the GOP depends on using the non-watermarked I-Frame in the next GOP. If the I-Frame in the next GOP were then evaluated and selected for watermarking, the I-Frame in the next GOP would be watermarked at the client-side, and the watermarked I-Frame would be used to decode the GOP. As a result, the error calculated for the GOP using the non-watermarked I-Frame in the next GOP is no longer a valid indicator of the error that will be introduced in the GOP due to client-side watermarking. Therefore, it is preferable that no two successive I-Frames be evaluated for watermarking.

Before proceeding to FIGS. 11A and 11B, it may be beneficial to note that the output of the industry standard video encoder 26 is such that any frames referenced by a frame are output prior to that frame. Thus, if a B-Frame references the I-Frame in the next GOP, then the I-Frame in the next GOP is output by the industry standard video encoder 26 prior to the B-Frame.

FIGS. 11A and 11B illustrate the operation of the I-Frame detection and selection function 30 of FIGS. 9 and 10 according to one embodiment of the present invention. First, the I-Frame detector 60 obtains the next frame in the compressed video stream (step 100) and determines whether the next frame is an I-Frame (step 102). If so, the I-Frame detector 60, or some other function such as the entropy decoder 62, determines whether an I-Frame is currently being evaluated (step 104). If not, the I-Frame detection and selection function 30 is set to an evaluation mode (step 106). The I-Frame is then entropy decoded (step 108), and the sample watermark is inserted into the entropy decoded I-Frame (step 110). Since the industry standard video decoder 68 is used, the watermarked I-Frame is then entropy encoded (step 112) and decoded by the industry standard video decoder 68 (step 114).

The error calculation function 70 then calculates an error for the I-Frame based on a comparison of the decoded video frame and the corresponding segment of the raw digital video input, and sums the calculated error with an error value for the GOP (step 116).

The process then proceeds to FIG. 11B where the I-Frame detection and selection function 30 determines whether the current frame is the last frame in the GOP (step 118). If not, the process returns to step 100 in FIG. 11A where the I-Frame detector 60 then gets the next frame from the compressed video stream (step 100) and determines whether the next frame is an I-Frame (step 102). Assuming that it is not, the I-Frame detection and selection function 30 then determines whether the current GOP is being evaluated (step 120). If not, the process returns to step 200. If so, the frame is decoded by the industry standard video decoder 68 to provide a decoded video frame (step 122). The error calculation function 70 then calculates an error for the frame based on a comparison of the decoded video frame and the corresponding segment of the raw digital video input, and sums the calculated error with the error value for the GOP (step 124). Assuming that the frame is not the last frame in the GOP, the process returns to step 100 such that the subsequent P-Frames and B-Frames are processed by steps 120-124 in order to calculate and sum the error for the GOP.

At some point, assuming that a frame in the GOP references the I-Frame for the next GOP, the I-Frame for the next GOP will be detected prior to the end of the GOP. Since the I-Frame detection and selection function 30 is in evaluation mode, the I-Frame for the next GOP is provided to the industry standard video decoder 68 and decoded to provide a decoded video frame (step 126). The decoded video frame is thereafter used to decode frames in the GOP that reference the I-Frame for the next GOP.

Since the last frame in the GOP has still not been detected, steps 100, 102, 122, 124, and 118 are repeated for each subsequent frame until the last frame in the GOP is detected in step 118. In this embodiment, once the last frame in the GOP is detected in step 118, the decision function 72 determines whether the error for the GOP is greater than an error threshold (step 128). If the error for the GOP is not greater than the error threshold, then the I-Frame under evaluation is selected as an I-Frame that may be used for client-side watermarking (step 130). If the error for the GOP is greater than the error threshold, then the I-Frame under evaluation is not selected. At this point, the I-Frame detection and selection function 30 transitions out of evaluation mode and evaluation is complete (step 132).

FIG. 12 is a more detailed block diagram of the I-Frame detection and selection function 30 of the source-side encoder 18 of FIG. 6 according to another embodiment of the present invention. This embodiment is similar to that discussed above with respect to FIGS. 9, 10, 11A, and 11B. However, the I-Frame detection and selection function 30 of this embodiment is particularly well suited for spatial domain watermarking techniques. The I-Frame detection and selection function 30 may be modified to operate using frequency domain techniques. Note that each of the blocks illustrated in FIG. 12 may be implemented in hardware, software, or a combination thereof.

The I-Frame detector 60 operates to detect I-Frames in the compressed video stream from the industry standard video encoder 26 (FIG. 6). Upon detecting an I-Frame, the I-Frame detector 60 notifies the watermarking function 74. Assuming that the I-Frame is to be evaluated, the watermarking function 74 obtains a segment of the raw digital video input corresponding to the I-Frame to be evaluated and inserts a sample watermark using a spatial domain watermarking technique.

An encoder 76 then encodes the watermarked segment of the raw digital video input to provide a watermarked version of the I-Frame being evaluated. Preferably, the encoder 76 encodes the watermarked segment using the same algorithm used by the industry standard video encoder 26 to encode I-Frames. Note that the watermarking function 74 and the encoder 76 may generally be referred to herein as a watermarking system. The watermarked I-Frame ($I_W$) is provided to the industry standard video decoder 68 and used to decode the associated frames in the GOP. The error calculation function 70 operates to calculate errors for each of the decoded video frames and optionally a combined error for the GOP. Then, based on the calculated error(s), the decision function 72 determines whether to select the I-Frame as an I-Frame that may be used for client-side watermarking.

In an alternative embodiment, the error calculation function 70 may obtain the watermarked segment of the raw digital video input output by the watermarking function 74 and calculate the error for the I-Frame based on a comparison of the watermarked segment of the raw digital video input output by the watermarking function 74 and the corresponding non-watermarked segment of the raw digital video input.

Note that, rather than using the industry standard video decoder 68, a custom video decoder may be used. If so, the custom video decoder may be designed such that custom video decoder may receive the watermarked segment from the watermarking function 74 such that the encoder 76 is not needed.

As another note, while the I-Frame detection and selection function 30 of FIG. 12 applies the sample watermark in the spatial domain, the I-Frame detection and selection function 30 of FIG. 12 may be modified to apply the sample watermark in the frequency domain. More specifically, the segment of the raw digital video input corresponding to the I-Frame being evaluated may be partially encoded to transform the segment of the raw digital video input from the spatial domain to the frequency domain using, for example, using DCT. The partial encoding may be performed by the watermarking function 74 or some partial encoding function. The watermarking function 74 may then insert the sample watermark using a frequency domain watermarking technique. The watermarked I-Frame may then be entropy encoded and provided to the industry standard video decoder 68.

FIG. 13 illustrates the operation of the I-Frame detection and selection function 30 of FIG. 12 during evaluation of an I-Frame. As illustrated, upon detecting an I-Frame to be evaluated in the compressed video stream from the industry standard video encoder 26, the segment of the raw digital video input corresponding to the I-Frame is obtained, and the sample watermark is applied to the segment of the raw digital video input using a spatial domain watermarking technique. The watermarked segment is then encoded to provide the watermarked I-Frame ($I_w$). The watermarked I-Frame is then provided to the industry standard video decoder 68 and used for decoding the group of related frames to provide decoded video frames ($F_X$). For example, the industry standard video decoder 68 may decode the frames according to the MPEG2 or MPEG4 standard. In this example, the group of related frames includes the P-Frames and B-Frames for the GOP as well as the I-Frame for the next GOP. The error calculation function 70 then compares the decoded video frames to the corresponding segments of the raw digital video input to determine the errors for each of the frames and optionally a combined error value for the GOP. The decision function 72 then determines whether to select the I-Frame as an I-Frame that may be used for client-side watermarking based on the error value(s).

FIGS. 14A and 14B illustrate the operation of the I-Frame detection and selection function 30 of FIGS. 12 and 13 according to one embodiment of the present invention. First, the I-Frame detector 60 obtains the next frame in the compressed video stream (step 200) and determines whether the next frame is an I-Frame (step 202). If so, the I-Frame detector 60, or the I-Frame detection and selection function 30 generally, determines whether an I-Frame is currently being evaluated (step 204). If not, the I-Frame detection and selection function 30 is set to an evaluation mode (step 206). A segment of the raw digital video input corresponding to the I-Frame is then obtained (step 208), and the sample watermark is inserted in the segment of the raw digital video input using a spatial domain watermarking technique (step 210). Since the industry standard video decoder 68 is used, the watermarked segment of the raw digital video input is then encoded according to the algorithm used by the industry standard video encoder 26 to provide the watermarked I-Frame (step 212). Using MPEG2 as an example, the segment of the raw digital video input may be divided into macroblocks, where each macroblock is discrete cosine transformed, quantized, and entropy encoded to provide the watermarked I-Frame. The watermarked I-Frame is then decoded by the industry standard video decoder 68 (step 214). The error calculation function 70 then calculates an error for the I-Frame based on a comparison of the decoded video frame and the corresponding segment of the raw digital video input, and sums the calculated error with an error value for the GOP (step 216).

The process then proceeds to FIG. 14B where the I-Frame detection and selection function 30 determines whether the current frame is the last frame in the GOP (step 218). If not, the process returns to step 200 in FIG. 14A where the I-Frame detector 60 gets the next frame from the compressed video stream (step 200) and determines whether the next frame is an I-Frame (step 202). Assuming that it is not, the I-Frame detection and selection function 30 then determines whether the current GOP is being evaluated (step 220). If not, the process returns to step 200. If so, the frame is decoded by the industry standard video decoder 68 (step 222) to provide a decoded video frame. The error calculation function 70 then calculates an error for the frame based on a comparison of the decoded video frame and the corresponding segment of the raw digital video input, and sums the calculated error with the error value for the GOP (step 224). Assuming that the frame is not the last frame in the GOP, the process returns to step 200 and the subsequent frames are processed by steps 220-224 in order to calculate and sum the error for the GOP.

At some point, assuming that one or more frames in the GOP references the I-Frame for the next GOP, the I-Frame for the next GOP will be detected prior to the end of the GOP. Since the I-Frame detection and selection function 30 is in evaluation mode, the I-Frame for the next GOP is provided to the industry standard video decoder 68 and decoded to provide a decoded video frame (step 226). The decoded video frame is thereafter used to decode frames in the GOP that reference the I-Frame for the next GOP.

Assuming that the last frame in the GOP has still not been detected, steps 200, 202, 222, 224, and 218 are repeated for each subsequent frame until the last frame in the GOP is detected in step 218. In this embodiment, once the last frame in the GOP is detected in step 218, the decision function 72 determines whether the error for the GOP is greater than an error threshold (step 228). If the error for the GOP is not greater than the error threshold, then the I-Frame under evaluation is selected as an I-Frame that may be used for client-side watermarking (step 230). If the error for the GOP is greater than the error threshold, then the I-Frame under evaluation is not selected. At this point, the I-Frame detection and selection function 30 transitions out of evaluation mode and evaluation is complete (step 232).

FIG. 15 illustrates the content source 12 according to one embodiment of the present invention. In general, the content source 12 includes a control system 78 including the source-side encoder 18. The source-side encoder 18 may be implemented in hardware, software, or a combination of hardware and software. In addition, the content source 12 includes a communication interface 80 communicatively coupling the content source 12 to the network 16 (FIG. 1). The content source 12 may also include a user interface 82, which may include components such as, for example, a display, one or more user input devices, and the like.

FIG. 16 illustrates the client device 14-1 according to one embodiment of the present invention. However, this discussion is equally applicable to the other client devices 14-2 through 14-N. In general, the client device 14-1 includes a control system 84 including the client-side re-encoder 20-1. The client-side re-encoder 20-1 may be implemented in hardware, software, or a combination of hardware and software. In addition, the client device 14-1 includes one or more digital storage devices 86 which may be used to store the watermarked copy of the compressed video stream. The client device 14-1 also includes a communication interface 88 communicatively coupling the client device 14-1 to the network 16 (FIG. 1). The client device 14-1 may also include a user interface 90 which may include components such as, for example, a display, one or more user input devices, and the like.

The present invention provides substantial opportunity for variation without departing from the spirit or scope of the present invention. For example, while client devices 14-1 through 14-N are preferably devices such as set-top boxes, personal computers, mobile devices such as PDAs or mobile phones, or the like, the present invention is not limited thereto. The client devices 14-1 through 14-N may be intermediary nodes between the content source 12 and end user nodes. For example, the intermediary nodes may be servers associated with content distributors. Thus, as used herein, "client-side watermarking" should not be limited to watermarking at an end user device. Rather, "client-side watermarking" may occur on any node downstream of the content source 12. Similarly, a "client" may be any node downstream of the content source.

Those skilled in the art will recognize improvements and modifications to the preferred embodiments of the present invention. All such improvements and modifications are considered within the scope of the concepts disclosed herein and the claims that follow.

What is claimed is:
1. A method comprising:
monitoring a compressed video stream;
detecting an Intra-Frame (I-Frame) in the compressed video stream;
generating a watermarked I-Frame corresponding to the I-Frame in the compressed video stream that is watermarked with a sample watermark similar to an actual watermark to be used for client-side watermarking;
encoding the plurality of associated frames referencing the I-Frame based on the watermarked I-Frame to provide a plurality of encoded video frames;

decoding the plurality of associated frames referencing the I-Frame based on the watermarked I-Frame to provide a plurality of decoded video frames;

comparing the decoded plurality of associated frames referencing the I-Frame based on the watermarked I-Frame with raw digital video input to determine an error; and determining whether to select the I-Frame as an I-Frame to be used for client-side watermarking based on the comparison.

2. The method of claim 1 wherein:

generating the compressed video stream comprises encoding the raw digital video input according to an encoding algorithm wherein each frame of the raw digital video input is transformed to a frequency domain and entropy encoded to provide the compressed video stream; and generating the watermarked I-Frame comprises:
 entropy decoding the I-Frame in the compressed video stream;
 watermarking the entropy decoded I-Frame with the sample watermark according to a frequency domain watermarking algorithm; and
 entropy encoding the watermarked, entropy decoded I-Frame to provide the watermarked I-Frame.

3. The method of claim 2 wherein encoding the raw digital video input comprises encoding the raw digital video input with an industry standard video encoder.

4. The method of claim 3 wherein encoding the raw digital video input with the industry standard video encoder comprises encoding the raw digital video input with an encoder selected from a group consisting of: an MPEG2 video encoder and an MPEG4 video encoder.

5. The method of claim 3 wherein decoding the plurality of associated frames referencing the I-Frame comprises decoding the plurality of associated frames with an industry standard video decoder.

6. The method of claim 5 wherein decoding the plurality of associated frames with the industry standard video decoder comprises decoding the plurality of associated frames with a decoder selected from a group consisting of: an MPEG2 video decoder and an MPEG4 video decoder.

7. The method of claim 1 wherein:

generating the compressed video stream comprises encoding the raw digital video input according to an encoding algorithm wherein each frame of the raw digital video input is transformed to a frequency domain and entropy encoded to provide the compressed video stream; and generating the watermarked I-Frame comprises:
 entropy decoding the I-Frame in the compressed video stream; and
 watermarking the decoded I-Frame with the sample watermark according to a frequency domain watermarking algorithm to provide the watermarked I-Frame.

8. The method of claim 1 wherein determining whether to select the I-Frame comprises:

determining an error value for each one of the plurality of decoded video frames based on a comparison of the one of the plurality of decoded frames and a corresponding segment of the raw digital video input used to generate the compressed video stream;

combining the error values for each one of the plurality of decoded video frames to provide a combined error value for the plurality of decoded video frames; and determining whether to select the I-Frame based on the combined error value.

9. The method of claim 8 wherein determining whether to select the I-Frame based on the combined error value comprises:

comparing the combined error value to an error threshold range; and selecting the I-Frame as an I-Frame to be used for client-side watermarking based on whether the combined error value is outside of the error threshold range.

10. The method of claim 1 further comprising, if the I-Frame is selected as an I-Frame to be used for client-side watermarking:

obtaining a segment of the raw digital video input used to generate the compressed video stream corresponding to the I-Frame;

generating a hybrid I-Frame from the segment of the raw digital video input, wherein the hybrid I-Frame is a low-loss version of the I-Frame in the compressed video stream;

providing the compressed video stream and the hybrid I-Frame to a client; and at the client:
 watermarking the hybrid I-Frame; and
 replacing the I-Frame in the compressed video stream with the watermarked hybrid I-Frame.

11. A system comprising:

an Intra-Frame (I-Frame) detector configured to:
 monitor a compressed video stream; and
 detect an I-Frame in the compressed video stream;

a watermarking system configured to generate a watermarked I-Frame corresponding to the I-Frame in the compressed video stream that is watermarked with a sample watermark similar to an actual watermark to be used for client-side watermarking;

a second encoder configured to encode the plurality of associated frames referencing the I-Frame based on the watermarked I-Frame to provide a plurality of encoded video frames;

a decoder configured to decode the plurality of associated frames referencing the I-Frame based on the watermarked I-Frame to provide a plurality of decoded video frames;

an error calculation function configured to:
 compare the decoded plurality of associated frames referencing the I-Frame based on the watermarked I-Frame with raw digital video input to determine an error; and
 determine a combined error value for the plurality of decoded video frames based on the comparison; and a decision function configured to determine whether to select the I-Frame as an I-Frame to be used for client-side watermarking based on the combined error value.

* * * * *